United States Patent
Hiratsuka et al.

(10) Patent No.: US 6,664,458 B2
(45) Date of Patent: Dec. 16, 2003

(54) APPARATUS AND METHOD FOR AUTOMATICALLY DETERMINING NOTATIONAL SYMBOLS BASED ON MUSICAL COMPOSITION DATA

(75) Inventors: Satoshi Hiratsuka, Hamamatsu (JP); Takashi Ikeda, Hamamatsu (JP); Masao Kondo, Hamamatsu (JP); Hiroshi Munekawa, Hyogo-ken (JP)

(73) Assignee: Yamaha Corporation (JP)

( * ) Notice: Subject to any disclaimer, the term of this patent is extended or adjusted under 35 U.S.C. 154(b) by 0 days.

(21) Appl. No.: 10/092,015

(22) Filed: Mar. 6, 2002

(65) Prior Publication Data

US 2002/0189425 A1 Dec. 19, 2002

(30) Foreign Application Priority Data

Mar. 6, 2001 (JP) ........................................ 2001-062682

(51) Int. Cl.[7] .............................................. G09B 15/08
(52) U.S. Cl. ...................................... 84/477 R; 84/619
(58) Field of Search .......................... 84/477 R, 470 R, 84/616, 619, 654, 656

(56) References Cited

U.S. PATENT DOCUMENTS

| 5,424,486 A | * | 6/1995 | Aoki | 84/613 |
| 5,525,749 A | * | 6/1996 | Aoki | 84/609 |
| 5,675,100 A | | 10/1997 | Hewlett | 84/462 |
| 6,100,462 A | * | 8/2000 | Aoki | 84/613 |
| 6,137,041 A | * | 10/2000 | Nakano | 84/470 R |
| 6,380,474 B2 | * | 4/2002 | Taruguchi et al. | 84/612 |
| 2002/0029685 A1 | * | 3/2002 | Aoki | 84/613 |

FOREIGN PATENT DOCUMENTS

| JP | 10-301566 | 11/1998 |
| JP | 2995237 | 10/1999 |

* cited by examiner

Primary Examiner—Jeffrey Donels
(74) Attorney, Agent, or Firm—Rossi & Associates

(57) ABSTRACT

A selected span of a music composition data file containing note data in the MIDI format which discriminates twelve notes per octave is examined with respect to respective tonalities to find an optimum tonality. Out of all the notes contained in the selected span, the number of notes that fall on the intrinsic notes of a tonality is counted with respect to each of the tonalities. The tonality which has the greatest count of intrinsic notes is determined to the optimum tonality. When the music composition is transposed, the chord names are altered according to the amount of the transposition. Then, the altered chord names are subjected to adjustment in expression according to the musical grammar. Accidental signs are adequately determined from among enharmonic notations.

17 Claims, 15 Drawing Sheets

Fig.2 Intrinsic and Extrinsic Notes in Respective Tanalities

| Key Signature | Tonality | Tonality | C | C# | D | D# | E | F | F# | G | G# | A | A# | B |
|---|---|---|---|---|---|---|---|---|---|---|---|---|---|---|
|  | C | C | ○ | ● | ○ | ● | ○ | ○ | ● | ○ | ● | ○ | ● | ○ |
|  | a | Am | ○ | ● | ○ | ● | ○ | ○ | ● | ● | △ | ○ | ● | ○ |
| # | G | G | ○ | ● | ○ | ● | ○ | ● | ○ | ○ | ● | ○ | ● | ○ |
|  | e | Em | ○ | ● | ● | △ | ○ | ● | ○ | ○ | ● | ○ | ● | ○ |
| ## | D | D | ● | ○ | ○ | ● | ○ | ● | ○ | ○ | ● | ○ | ● | ○ |
|  | h | Bm | ● | ○ | ○ | ● | ○ | ● | ○ | ○ | ● | ● | △ | ○ |
| ### | A | A | ● | ○ | ○ | ● | ○ | ● | ○ | ● | ○ | ○ | ● | ○ |
|  | fis | F#m | ● | ○ | ○ | ● | ● | △ | ○ | ● | ○ | ○ | ● | ○ |
| #### | E | E | ● | ○ | ● | ○ | ○ | ● | ○ | ● | ○ | ○ | ● | ○ |
|  | cis | C#m | △ | ○ | ● | ○ | ○ | ● | ○ | ● | ○ | ○ | ● | ● |
| ##### | H | B | ● | ○ | ● | ○ | ○ | ● | ○ | ● | ○ | ● | ○ | ○ |
|  | gis | G#m | ● | ○ | ● | ○ | ○ | ● | ● | △ | ○ | ● | ○ | ○ |
| ♭♭♭♭♭♭ | Ges | Gb | ● | ○ | ● | ○ | ● | ○ | ○ | ● | ○ | ● | ○ | ○ |
|  | es | Ebm | ● | ● | △ | ○ | ● | ○ | ○ | ● | ○ | ● | ○ | ○ |
| ♭♭♭♭♭ | Des | Db | ○ | ○ | ● | ○ | ● | ○ | ○ | ● | ○ | ● | ○ | ● |
|  | b | Bbm | ○ | ○ | ● | ○ | ● | ○ | ○ | ● | ● | △ | ○ | ● |
| ♭♭♭♭ | As | Ab | ○ | ○ | ● | ○ | ● | ○ | ● | ○ | ○ | ● | ○ | ● |
|  | f | Fm | ○ | ○ | ● | ● | △ | ○ | ● | ○ | ○ | ● | ○ | ● |
| ♭♭♭ | Es | Eb | ○ | ● | ○ | ● | ○ | ● | ○ | ● | ○ | ● | ○ | ● |
|  | c | Cm | ○ | ● | ○ | ● | ○ | ● | ○ | ● | ○ | ● | ● | △ |
| ♭♭ | B | Bb | ○ | ● | ○ | ● | ○ | ● | ○ | ● | ○ | ● | ○ | ● |
|  | g | Gm | ○ | ● | ○ | ● | ● | ● | △ | ● | ○ | ● | ○ | ● |
| ♭ | F | F | ○ | ● | ○ | ● | ○ | ○ | ● | ○ | ● | ○ | ○ | ● |
|  | d | Dm | ● | △ | ○ | ● | ○ | ○ | ● | ○ | ● | ○ | ○ | ● |

○ Notated without Accidental (Intrinsic Note)
● Notated with Accidental (Extrinsic Note)
△ Notated with Accidental, but Considered Intrinsic Note Fig.3a Automatic Determination of Tonality Fig.3b Automatic Determination of Tonality

| Key Signature | Tonality | Number of Intrinsic Notes | Number of Extrinsic Notes |
|---|---|---|---|
| ♭ | F | 47 | 29 |
| ♭ | Dm | 49 | 27 |
|  | C | 51 | 25 |
|  | Am | 46 | 30 |
| # | G | 68 | 8 |
| # | Em | 60 | 16 |
| ## | D | 70 | 6 |
| ## | Bm | 47 | 29 |
| ### | A | 65 | 11 |
| ### | F#m | 62 | 14 |

| Key Signature | Tonality | Number of Intrinsic Notes | Number of Extrinsic Notes |
|---|---|---|---|
| ♭♭ | Bb | 58 | 2 |
| ♭♭ | Gm | 48 | 12 |
| ♭ | F | 58 | 2 |
| ♭ | Dm | 40 | 20 |
|  | C | 56 | 4 |
|  | Am | 56 | 4 |

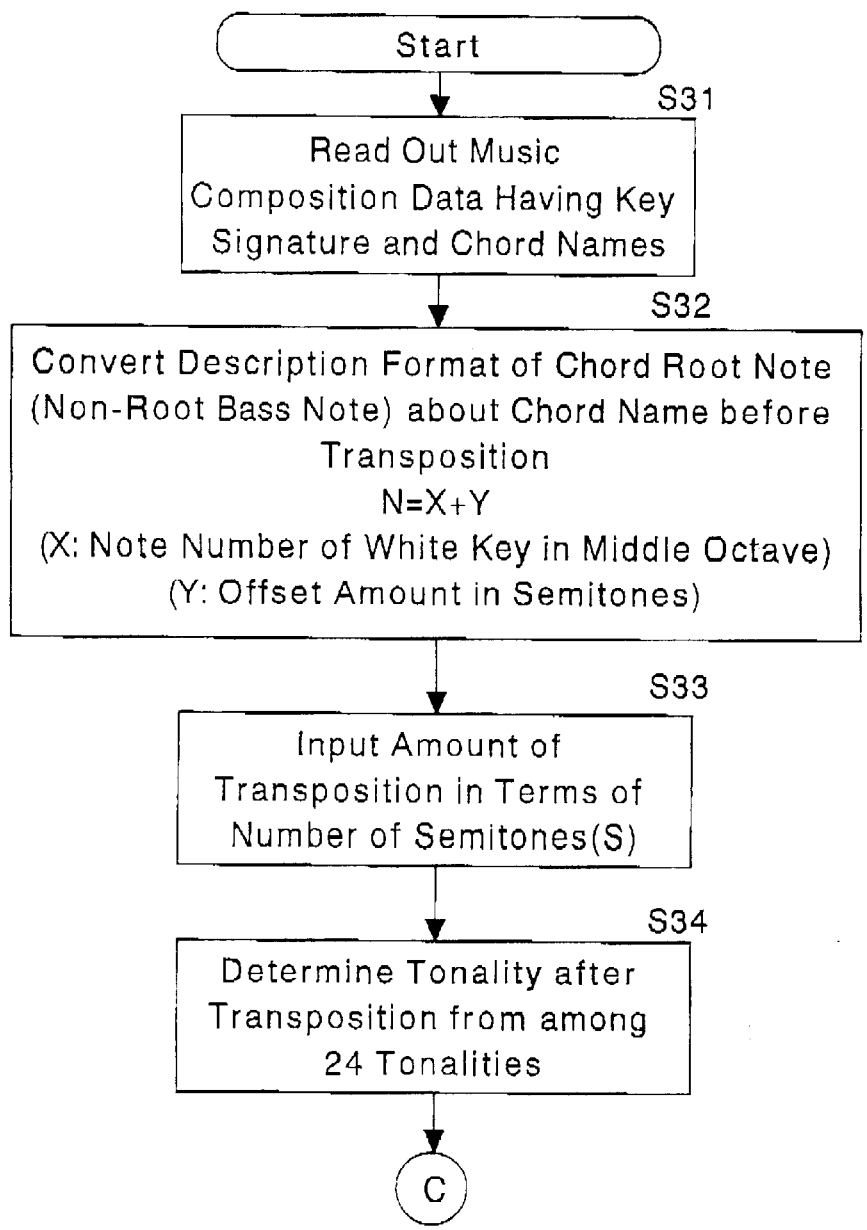
Fig.9a Automatic Determination of Chord Name after Transposition

Fig.9b Automatic Determination of Chord Name after Transposition
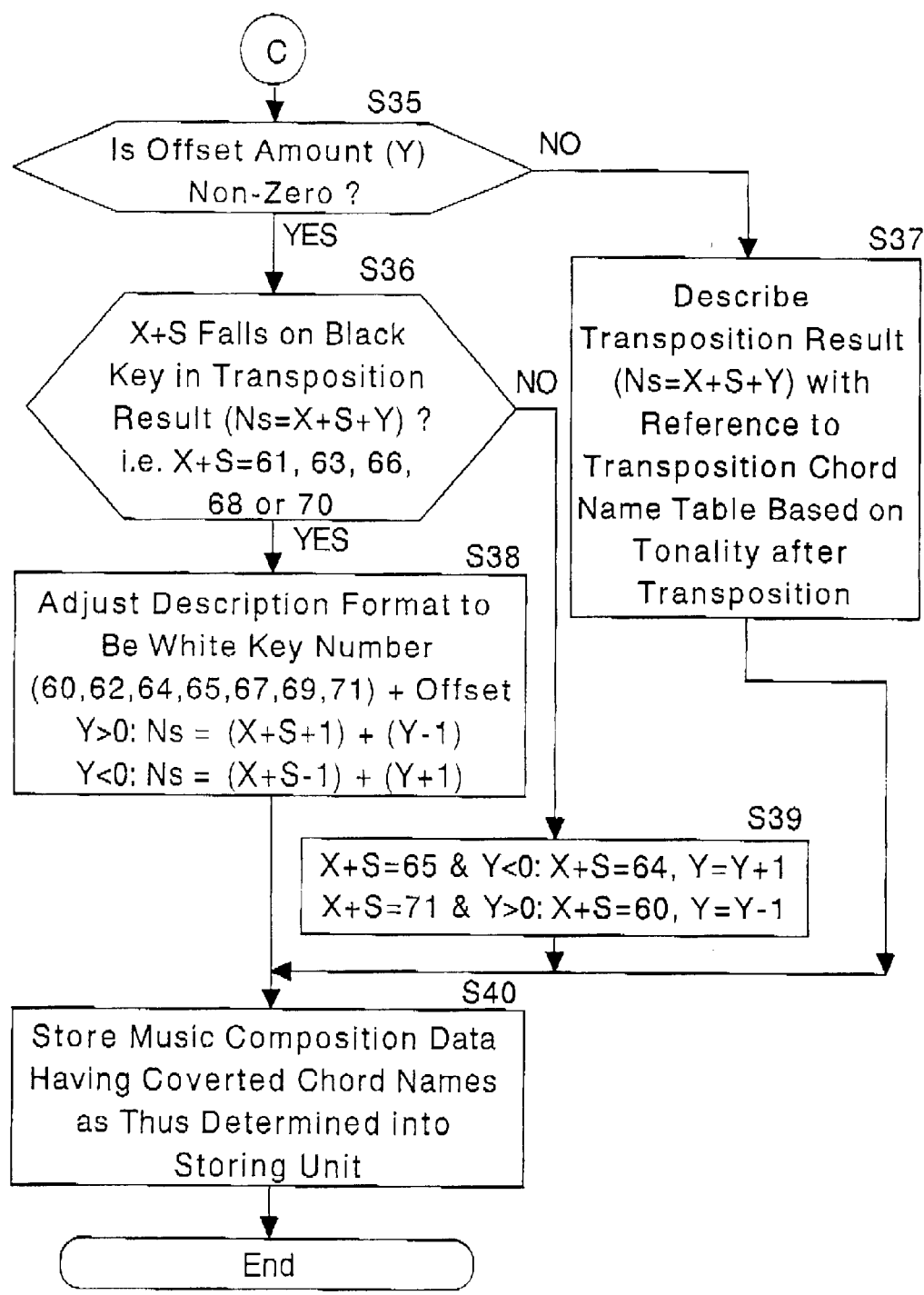

Fig. 10 Chord Name Table about Transposition

| MIDI Note Number | 60 | 61 | 62 | 63 | 64 | 65 | 66 | 67 | 68 | 69 | 70 | 71 |
|---|---|---|---|---|---|---|---|---|---|---|---|---|
| White Key Position | C | | D | | E | F | | G | | A | | H |
| Tonality Cb(Abm) | C | Db | D | Eb | E | F | Gb | G | Ab | A | Bb | Cb |
| Gb(Ebm) | C | Db | D | Eb | E | F | Gb | G | Ab | A | Bb | Cb |
| Db(Bbm) | C | Db | D | Eb | E | F | Gb | G | Ab | A | Bb | Cb |
| Ab(Fm) | C | Db | D | Eb | E | F | Gb | G | Ab | A | Bb | Cb |
| Eb(Cm) | C | Db | D | Eb | E | F | Gb | G | Ab | A | Bb | Cb |
| Bb(Gm) | C | Db | D | Eb | E | F | Gb | G | Ab | A | Bb | B |
| F(Dm) | C | Db | D | Eb | E | F | F# | G | Ab | A | Bb | B |
| C(Am) | C | C# | D | Eb | E | F | F# | G | Ab | A | Bb | B |
| G(Em) | C | C# | D | Eb | E | F | F# | G | G# | A | Bb | B |
| D(Bm) | C | C# | D | D# | E | F | F# | G | G# | A | Bb | B |
| A(F#m) | C | C# | D | D# | E | F | F# | G | G# | A | A# | B |
| E(C#m) | C | C# | D | D# | E | E# | F# | G | G# | A | A# | B |
| B(G#m) | B# | C# | D | D# | E | E# | F# | G | G# | A | A# | B |
| F#(D#m) | B# | C# | D | D# | E | E# | F# | G | G# | A | A# | B |
| C#(A#m) | B# | C# | D | D# | E | E# | F# | G | G# | A | A# | B |

Fig. 11a
Original Table
| Note Degree | Tonic | Supertonic | Mediant | Subdominant | Dominant | Submedient | Subtonic |
|---|---|---|---|---|---|---|---|
| Alteration | 0 | + | − | 0 | + | + | − |
| | | 0 | 0 | 0 | 0 | 0 | 0 |
Fig. 11b
Fig. 11c
Fig. 11d
Modified Table
| Note Degree | Tonic | Supertonic | Mediant | Subdominant | Dominant | Submedient | Subtonic |
|---|---|---|---|---|---|---|---|
| Major scale | 0 | + | − | 0 | + | − | − |
| Minor scale | 0 | + | + | 0 | + | + | 0 |
| | | 0 | 0 | 0 | 0 | 0 | 0 |

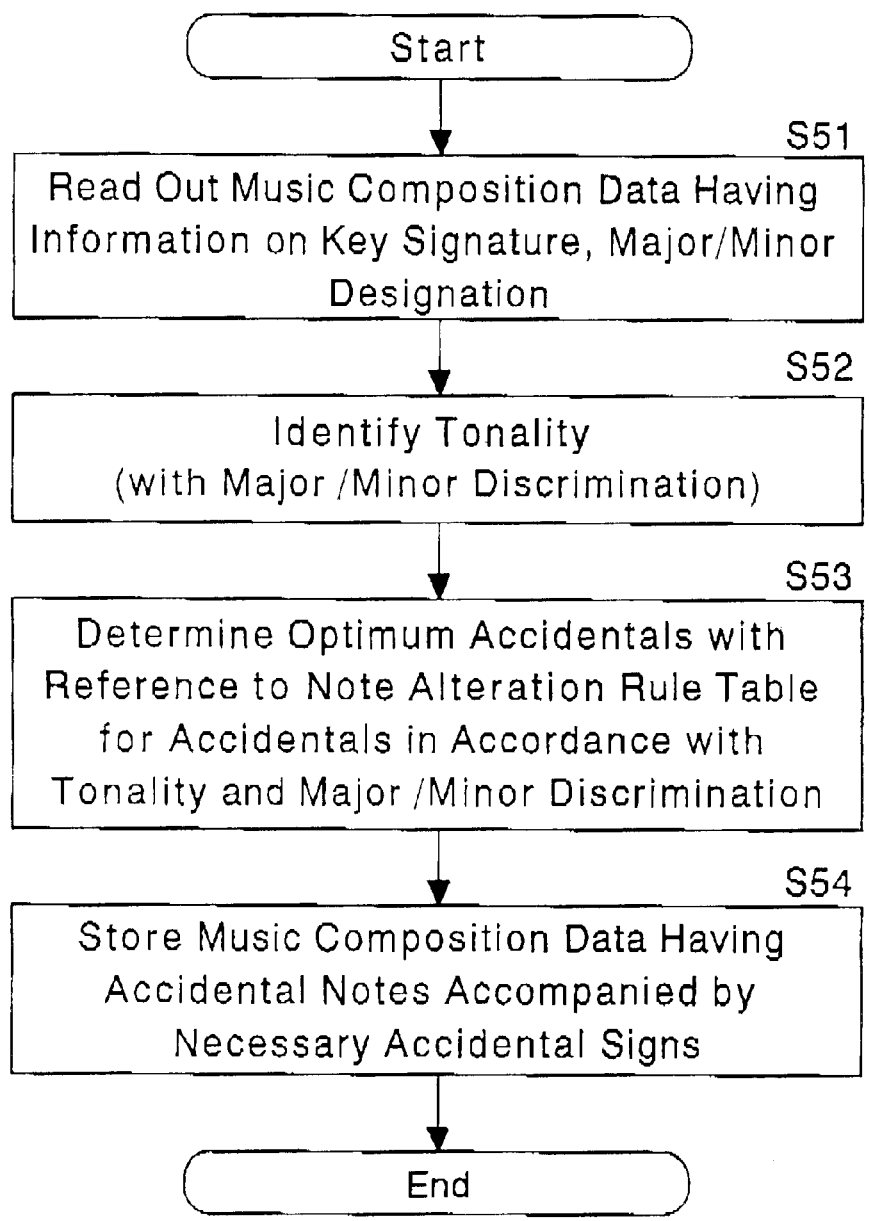
*Fig.12 Automatic Determination of Accidental Sign*

Fig.13a  Chord Name Table about Transposition

Specific Example for Major Scale

| MIDI Note Number | | 60 | 61 | 62 | 63 | 64 | 65 | 66 | 67 | 68 | 69 | 70 | 71 |
|---|---|---|---|---|---|---|---|---|---|---|---|---|---|
| White Key Position | | C | | D | | E | F | | G | | A | | H |
| Tonality | Cb | C | Db | Ebb | Eb | Fb | F | Gb | Abb | Ab | Bbb | Bb | Cb |
| | Gb | C | Db | Ebb | Eb | Fb | F | Gb | G | Ab | Bbb | Bb | Cb |
| | Db | C | Db | D | Eb | Fb | F | Gb | G | Ab | Bbb | Bb | Cb |
| | Ab | C | Db | D | Eb | Fb | F | Gb | G | Ab | A | Bb | Cb |
| | Eb | C | Db | D | Eb | E | F | Gb | G | Ab | A | Bb | Cb |
| | Bb | C | Db | D | Eb | E | F | Gb | G | Ab | A | Bb | B |
| | F | C | Db | D | Eb | E | F | F# | G | Ab | A | Bb | B |
| | C | C | C# | D | Eb | E | F | F# | G | Ab | A | Bb | B |
| | G | C | C# | D | Eb | E | F | F# | G | G# | A | Bb | B |
| | D | C | C# | D | D# | E | F | F# | G | G# | A | Bb | B |
| | A | C | C# | D | D# | E | F | F# | G | G# | A | A# | B |
| | E | C | C# | D | D# | E | E# | F# | G | G# | A | A# | B |
| | B | B# | C# | D | D# | E | E# | F# | G | G# | A | A# | B |
| | F# | B# | C# | D | D# | E | E# | F# | F## | G# | A | A# | B |
| | C# | B# | C# | C## | D# | E | E# | F# | F## | G# | A | A# | B |

Fig.13b  Chord Name Table about Transposition

Specific Example for Minor Scale

| MIDI Note Number | | 60 | 61 | 62 | 63 | 64 | 65 | 66 | 67 | 68 | 69 | 70 | 71 |
|---|---|---|---|---|---|---|---|---|---|---|---|---|---|
| White Key Position | | C | | D | | E | F | | G | | A | | H |
| Tonality | Abm | C | Db | D | Eb | Fb | F | Gb | G | Ab | Bbb | Bb | Cb |
| | Ebm | C | Db | D | Eb | Fb | F | Gb | G | Ab | A | Bb | Cb |
| | Bbm | C | Db | D | Eb | E | F | Gb | G | Ab | A | Bb | Cb |
| | Fm | C | Db | D | Eb | E | F | Gb | G | Ab | A | Bb | B |
| | Cm | C | Db | D | Eb | E | F | F# | G | Ab | A | Bb | B |
| | Gm | C | C# | D | Eb | E | F | F# | G | Ab | A | Bb | B |
| | Dm | C | C# | D | Eb | E | F | F# | G | G# | A | Bb | B |
| | Am | C | C# | D | D# | E | F | F# | G | G# | A | Bb | B |
| | Em | C | C# | D | D# | E | F | F# | G | G# | A | A# | B |
| | Bm | C | C# | D | D# | E | E# | F# | G | G# | A | A# | B |
| | F#m | B# | C# | D | D# | E | E# | F# | G | G# | A | A# | B |
| | C#m | B# | C# | D | D# | E | E# | F# | F## | G# | A | A# | B |
| | G#m | B# | C# | C## | D# | E | E# | F# | F## | G# | A | A# | B |
| | D#m | B# | C# | C## | D# | E | E# | F# | F## | G# | G## | A# | B |
| | A#m | B# | C# | C## | D# | D## | E# | F# | F## | G# | G## | A# | B |

APPARATUS AND METHOD FOR AUTOMATICALLY DETERMINING NOTATIONAL SYMBOLS BASED ON MUSICAL COMPOSITION DATA

RELATED APPLICATION

This application claims priority from Japanese Patent Application No. 2001-062682, filed Mar. 6, 2001, the contents of which are incorporated hereinto by this reference.

BACKGROUND OF THE INVENTION

1. Field of the Invention

The present invention relates to a musical apparatus and a method for automatically determining musical notational symbols based on musical composition data, and a computer program for realizing such an apparatus and a method using a computer system, and more particularly to an apparatus and a method capable of determining musical symbols to be exhibited on a musical score as expressed in musical notation according to the prevailing rules with respect to such musical symbols as alteration marks and note descriptions, the alteration marks including sharps, flats and naturals for accidental notes and key signatures, the note descriptions including note names for describing tonalities, chord names and non-root bass notes.

2. Description of the Prior Art

A music composition (or song) data set is usually obtained by recording the performance data which are inputted from a keyboard on which a musical performance is played or the performance data which are created by individually inputting data of performance events using a music sequencer. The key signature, however, will be recorded in the music composition data set, only if it is manually inputted by the composer (or user). In this connection, an electronic musical instrument or a computer having a sequencer program installed therein can exhibit or display a musical score with the notes based on such a music composition data set, but the key signature will not be exhibited as long as it is manually inputted by the composer. And moreover, the key signature is to be determined according to musical expertise, and therefore a key signature manually inputted even by a composer may not always be correct from a musical point of view. The key signature is expressed by using accidentals including a sharp sign (♯) and a flat sign (b). It should be understood herein that the musical flat sign will be represented by an alphabet character "b" in the non-superscripted level, where necessary for the sake of typing convenience, as long as it is so understandable from the context. The numeral "7" for the seventh chord will not be subscripted, either, for the sake of typing convenience. An accidental sign is a mark which alter the pitch of the natural note to which it is affixed. Other accidentals are double sharp "♯♯", a double flat "bb", and a natural mark. The double sharp mark is usually depicted in the shape similar to the alphabet character "x" in the field of music, but it is herein expressed by "♯♯" mark for the sake of typing convenience.

Depending on the data format some music composition data sets include data of chord names in addition to data of notes in the music progression. There are two prevailing methods (or formats) of expressing the chord names by their root notes and sometimes with their non-root bass notes, the twelve (12)-note expression and the thirty-one (31)-note expression. The 12-note format of expressing the chord names relies on the twelve notes in an octave under the equal temperament, not discriminating enharmonic notes (e.g. D♯ and Eb), and is conveniently employed in the MIDI (musical instrument digital interface) protocol. This note name expression is very convenient, including some inaccuracy, though. On the other hand, the 31-note format of expressing the chord names relies on the traditional method in the field of music, describing the enharmonic notes differently for the sharped notes and the flatted notes. This note name expression is ruled in the "XF format protocol" as proposed by YAMAHA Corporation. Each of the 12-note expression system and the 31-note expression system is closed and consistent within each expression system.

However, if these two systems are used together (or intermingled), one-to-one correspondence will not be ensured, and a definite name may not be determined uniquely in the case of transposition. For example, if an amount of transposition is designated by using the 12-note system (i.e. simply by the number of semitones) where the chord names are expressed by the 31-note system, the two systems are intermingled and the chord names may not always be determined uniquely under the 31-note system after the transposition. The problem is the matter of selecting (or determining) the accidental marks (pitch altering marks) to be used in expressing the chord root or the non-root bass (sometimes described after a slash mark "/"). The accidental marks are also used to raise or lower the pitches of individual note temporarily in the musical score. The accidentals are affixed to particular notes relative to the tonality. And therefore, in the case where the inputted music composition data are described in the 12-note expression system, it will be a matter of question which of the enharmonic notes to use for describing such a note in the traditional 31-note expression system.

SUMMARY OF THE INVENTION

It is, therefore, a primary object of the present invention to solve the above described drawbacks and to provide a novel type of musical apparatus and a method for automatically determining notational symbols based on musical composition data as well as an apparatus and a method for exhibiting a musical score with such properly determined notational symbols, and a computer program for realizing such apparatuses and methods using a computer system capable of determining musical symbols to be exhibited on a musical score, wherein the determined and expressed musical symbols are expressed properly in musical notation according to the prevailing rules with respect to such musical symbols as alteration marks and note descriptions.

According to the present invention, the object is accomplished by providing an apparatus for determining musical notational symbols based on musical composition data, comprising: a music composition data storing device which stores music composition data representing a length of music containing a progression of notes; a music data readout device which reads out the music composition data; a first selecting device which counts the number of notes which are intrinsic to each of a predetermined plurality of tonalities among the notes contained in a selected span of the length of music, and selects a single optimum tonality or plural tonality candidates based on the counted number of intrinsic notes with respect to each tonality according to a first selection rule; a second selecting device which extracts notes to be subjected to judgment from among a top sub-span of the selected span, examine whether there is a single tonality whose tonic chord includes all of the extracted subject notes among the plural tonality candidates, and, if and only if there is, selects the single tonality to be an optimum tonality; a third selecting device which selects a tonality having a least number of accidental signs among the plural tonality candidates to be an optimum tonality; and a key signature determining device which determines a key signature for the optimum tonality selected by any one of the first, second and third selecting devices.

According to an aspect of the present invention, a musical notational symbol determining apparatus may further comprise a key signature write-in device which writes the determined key signature, into the music composition data storing device.

According to another aspect of the present invention, a musical notational symbol determining apparatus may further comprise a key signature designating input device for inputting a key signature by a user's operation to designate the key signature; and a key signature altering device which alters the key signature determined by the key signature determining device to the inputted key signature.

According to the present invention, the object is further accomplished by providing an apparatus for determining musical notational symbols based on musical composition data, comprising: a music composition data storing device which stores music composition data representing a length of music containing a progression of notes, together with chord names and a tonality expressed with enharmonic discrimination, each of the chord names being identified by a chord root and a chord type, the chord root being expressed by a name of a basic note plus an amount of pitch alteration; a music data readout device which reads out the music composition data including the notes, the chord names and the key signature; a transposition designation input device which designates an amount of transposition in terms of the number of semitones; a chord root shifting device which shifts the chord roots by shifting the names of the respective basic notes by the amount of transposition and obtains transposed chord roots each of which is expressed by a shifted basic note plus the alteration amount; a first chord root determining device which, in the case where the alteration amount is not zero and the shifted basic note becomes a note expressed by a natural note plus an accidental sign and falling on an accidental note, converts the expression of the shifted basic note to an expression of a natural note which is adjacent to the shifted basic note in the direction of alteration by the accidental sign and adjusts the alteration amount by the amount and in the reverse direction of the conversion of the shifted basic note to obtain a transposed chord name; a second chord root determining device which, in the case where the alteration amount is not zero and the shifted basic note becomes a note expressed by a natural note plus an accidental sign and falling on a natural note, converts the expression of the shifted basic note to an expression of the natural note on which the shifted basic note falls and adjusts the alteration amount by the amount and in the reverse direction of the conversion of the shifted basic note to obtain a transposed chord name; a third chord root determining device which, in the case where the alteration amount is zero, determines the expression of the shifted basic note in view of the tonality after the transposition to obtain a transposed chord name; and a chord name rewriting device which rewrites chord names contained in the stored music composition data according to the transposed chord name obtained by the first, second or third chord root determining device.

According to the present invention, the object is further accomplished by providing an apparatus for exhibiting a musical score based on musical composition data, comprising: a music composition data providing device which provides music composition data representing a length of music containing a progression of notes; a display device which displays a music score based on the music composition data; a tonality determining device which determines an optimum tonality by examining the music composition data to find, with respect to each of plural tonalities, how many notes as represented by the music composition data are contained in the each tonality and by determining an optimum tonality based on the examining; and a display control device which controls the display device to display the music score according to the optimum tonality.

According to a further aspect of the present invention, a musical score exhibiting apparatus may further comprise a chord name exhibit/unexhibit designating device which designates whether or not to exhibit chord names on the music score being displayed; and a chord name exhibit controlling device which controls the display device to exhibit or not to exhibit the chord names on the music score according to the designation.

According to the present invention, the object is further accomplished by providing an apparatus for exhibiting a musical score based on musical composition data which comprises any of the above described apparatus for determining musical notational symbols; and further comprises: a display device; a chord name exhibit/unexhibit designating input device; and a display controlling device which controls the display device to exhibit a musical score with the chord names when the music composition data contains chord names and the chord name exhibit/unexhibit designating input device is designating the exhibit condition, and controls the display device to exhibit a musical score without the chord names when the chord name exhibit/unexhibit designating input device is designating the unexhibit condition.

According to the present invention, the object is further accomplished by providing an apparatus for determining musical notational symbols based on musical composition data, comprising: a music composition data storing device which stores music composition data representing a length of music containing a progression of notes together with a key signature and a major/minor designation; a music data readout device which reads out the music composition data; an accidental sign determining device which determines what accidental signs to be affixed to which of the notes according to the note name, the key signature and the major/minor designation; and an accidental sign affixing device which affixes each of the determined accidental signs to the note to which the each determined accidental sign is to be affixed.

According to a further aspect of the present invention, a musical notational symbol determining apparatus may further comprise: an accidental sign write-in device which writes, into the music composition data storing device, the accidental signs affixed to the notes in correspondence to the notes in the music composition data.

As will be understood from the above description about the apparatus for determining musical notational symbols based on music composition data and the apparatus for exhibiting a musical score based on music composition data, a sequence of the steps each performing the operational function of each of the structural elements of the above apparatuses will constitute a method for determining musical notational symbols and a method for exhibiting a musical score according to the spirit of the present invention.

Further as will be understood from the above description about the apparatus and the method for determining musical notational symbols based on music composition data and the apparatus and the method for exhibiting a musical score based on music composition data, a machine readable medium containing a program instructions executable by a computer system for executing a sequence of the processes each performing the operational function of each of the structural elements of the above musical notational symbol determining apparatus and the above music score exhibiting apparatus or performing each of the steps constituting the above musical notational symbol determining method and the above music score exhibiting method will reside within the spirit of the present invention.

As will be apparent from the description herein later, some of the structural element devices of the present invention are configured by a computer system performing the assigned functions according to the associated programs. They may of course be hardware structured discrete devices. Therefore, a hardware-structured device performing a certain function and a computer-configured arrangement performing the same function should be considered a same-named device or an equivalent to each other,

BRIEF DESCRIPTION OF THE DRAWINGS

For a better understanding of the present invention, and to show how the same may be practiced and will work, reference will now be made, by way of example, to the accompanying drawings, in which:

FIGS. 9a and 9b are, in combination, a flow chart describing the chord name determining process after transposition in an embodiment of the present invention;

FIG. 10 is a chart showing a lookup table of chord names in connection with transposition as used in the flow chart of FIG. 9;

FIG. 11a is a table showing an original rule for notes altered by accidentals;

FIG. 11b is a chart showing an example of a musical score as expressed in accordance with the rule of FIG. 11c;

FIG. 11c is a chart showing an example of a musical score as expressed in accordance with a modified rule;

FIG. 11d is a table showing a modified rule for notes altered by accidentals separately prepared for a major scale and a minor scale;

FIG. 12 is a flow chart describing a process of automatically determining accidentals;

FIGS. 13a and 13b are charts showing lookup tables of chord names (also applicable to note names) in connection with transposition prepared separately for the major scale and the minor scale, respectively, by applying the modified rules of FIG. 11d to the lookup table of FIG. 10.

DESCRIPTION OF THE PREFERRED EMBODIMENTS

Figure 1:
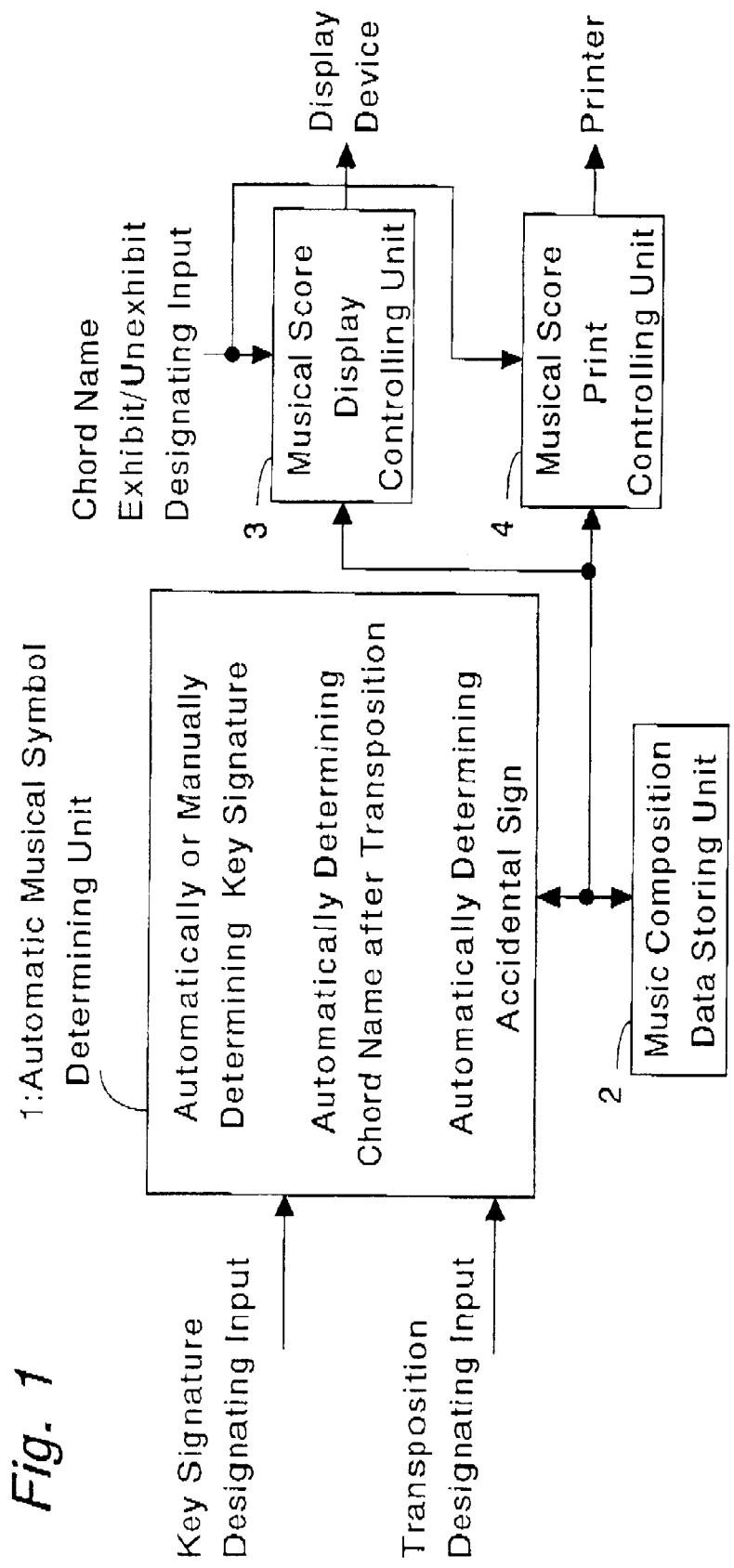
FIG. 1 is a block diagram illustrating an embodiment of an apparatus for automatically determining musical symbols based on music composition data together with devices for controlling the exhibit of a musical score based on music composition data according to the present invention.

FIG. 1 is a block diagram illustrating an embodiment of an apparatus for automatically determining musical symbols based on music composition data together with devices for controlling the exhibit of a musical score based on music composition data according to the present invention. The apparatus comprises an automatic musical symbol determining unit 1, a music composition data storing unit 2, a musical score display controlling unit 3 and a musical score print controlling unit 4. The automatic musical symbol determining unit 1 receives at least a part of a music composition data set (a data set representing a music piece, a tune, a song, etc.) stored in the music composition data storing unit 2, determines a key signature to be expressed using accidental signs (pitch altering marks) automatically or manually, determines chord names after transposition automatically, determines accidental signs to be used for the related notes automatically, and outputs the determined signs and names to the music composition data storing unit 2. The original music composition data set may be retained or may be overwritten by the altered music composition data set. The musical symbol determining unit 1 may execute any of these processes individually to the original music composition data set, or may execute another process cumulatively to the music composition data set after a process has been executed.

The musical score display controlling unit 3 reads out the music composition data set from the music composition data storing unit 2 and controls a display device or the like to display a music score of the music composition. The display device exhibits the notes for the music progression together with the key signature, chord names, accidental signs, and so forth. Similarly, the musical score print controlling unit 4 reads out the music composition data set from the music composition data storing unit 2 and controls a printer to print out a musical score. The printed score includes a key signature, chord names, accidental signs, etc. together with the notes for the music progression. The musical score display controlling unit 3 and the musical score print controlling unit 4 are to be designated by the user whether to exhibit the chord names on the musical score or not while the above description refers to the case where the processing of automatic determination of the key signature, the chord names after transposition and the accidental signs based on the music composition data set and the processing of displaying or printing the musical score from the music composition data set are performed separately, the both processing may be intermingled into unitary processing to be conducted in real time. Namely, the altered music composition data set including the above determinations may not necessarily be outputted to the music composition data storing unit 2 to be stored therein, and may be outputted to the display controlling unit 3 and the print controlling unit 4 from time to time (one time after another) to exhibit the musical score in real time.

Figure 2:
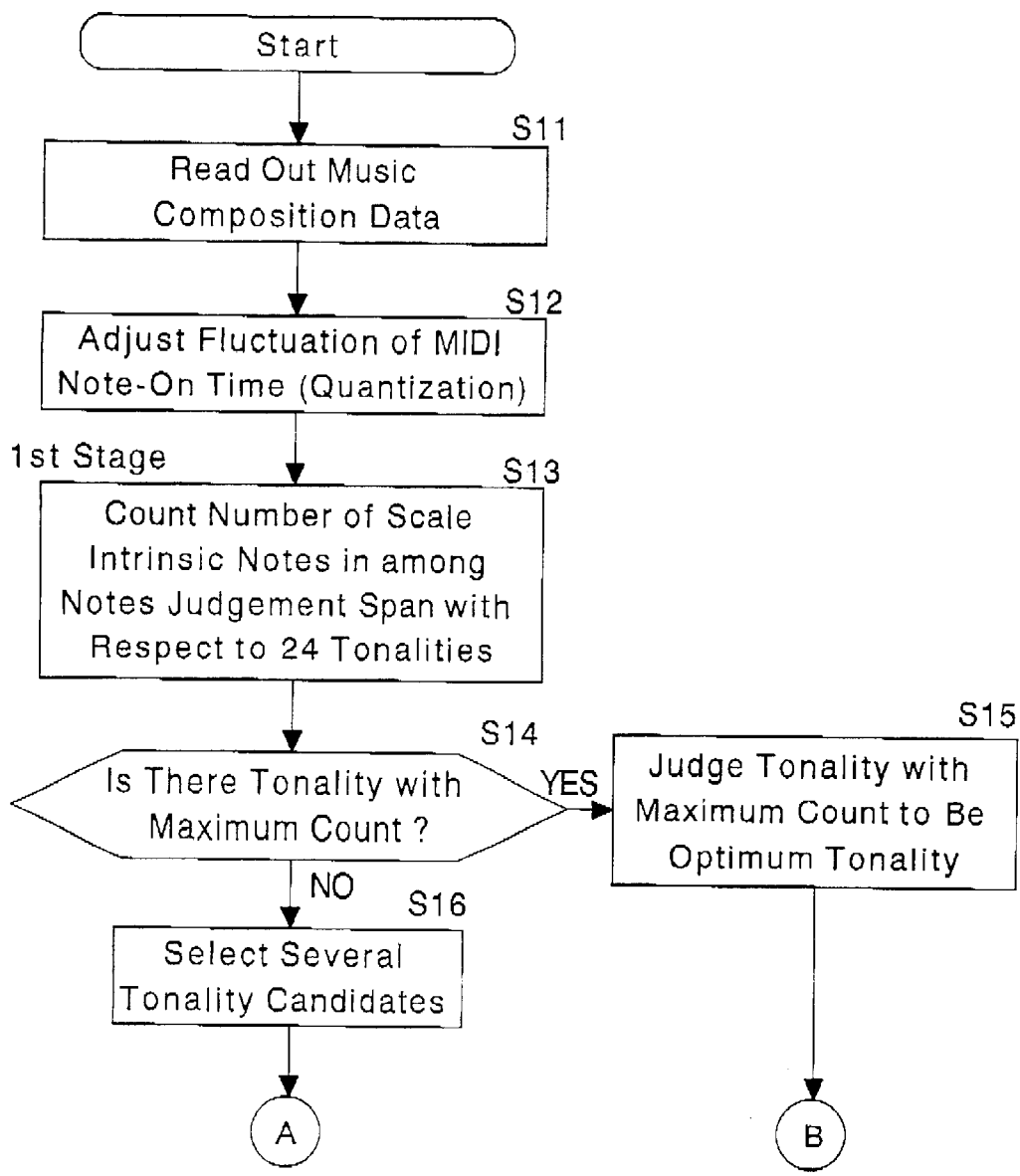
FIG. 2 is a chart showing a table of notes with respect to various musical scales employed in the present invention.

FIG. 2 is a table of notes with respect to various musical scales employed in the present invention. The top row denotes indexes of columns. The first (leftmost) column indicates key signatures for the tonality keys indicated in the second and the third columns, wherein the second column describes the tonalities in German language and the third column describes in English. There can be fifteen key signatures ranging from seven sharps through seven flats theoretically, but twelve key signatures ranging from five sharps through six flats are described in the table corresponding to all of the twelve notes in an octave. Consequently, the table contains twenty-four tonalities including twelve major scales and twelve minor scales.

The table covers the following twelve key signatures. No accidental (neither sharp nor flat) covering C major key (C) and A minor key (Am), one trough five sharps covering G major key (G) and E minor key (Em) through B major key (B) and G♯ minor key (G♯m), and one through six flats covering F major key (F) and D minor key (Dm) through Gb major key (Gb) and Eb minor key (Ebm). Enharmonic pairs of keys such as Gb and F♯, Ebm and D♯m, Db and C♯, Bbm and A♯m, H and Cb, and G♯m and Abm are not discriminable according to the twelve listed key signatures, and consequently the tonality keys of F♯, D♯m, C♯, A♯m, Cb and Abm are omitted from consideration in judgment. As each one key signature covers a major key and a relative minor key, there are twenty-four tonality keys in all. In this invention, however, it is the key signature that is in question in exhibiting a musical score, and therefore the present invention essentially concerns the number of sharps or flats for the key signature, and the distinction between the major key and the minor key expressed by the same key signature are a matter of second importance herein.

The table illustrates intrinsic notes (i.e. diatonic scale notes from the first degree through seventh degree notes of the scale) and extrinsic notes (i.e. altered notes from the diatonic scale notes) on the assumption that the music composition data are described according to the twelve-note expression system such as a standard MIDI file (SMF), and therefore each enharmonic pair of notes are not distinctively shown here. For example, D♯ in the note name row also means Eb, and Eb in the tonality column also means D♯. The note names and the tonality names, therefore correspond to the MIDI note numbers (including twelve notes in an octave) in one to one correspondence. In the table, hollow circles indicate intrinsic notes which are noted under the key signatures alone for the respective tonalities and without temporary accidental marks, solid circles indicate extrinsic notes which cannot be noted under the key signatures alone for the respective tonalities but with temporary accidental marks, and hollow triangles indicates notes expressed with temporary accidental marks under the key signatures for the respective tonalities but constitute the subtonics or leading notes in the respective harmonic minor scales, and accordingly are considered to be intrinsic notes herein. For example, the note G♯ in the Am scale is the subtonic in the harmonic A minor scale, and therefore are considered an intrinsic note in the tonality of Am.

Figure 3:
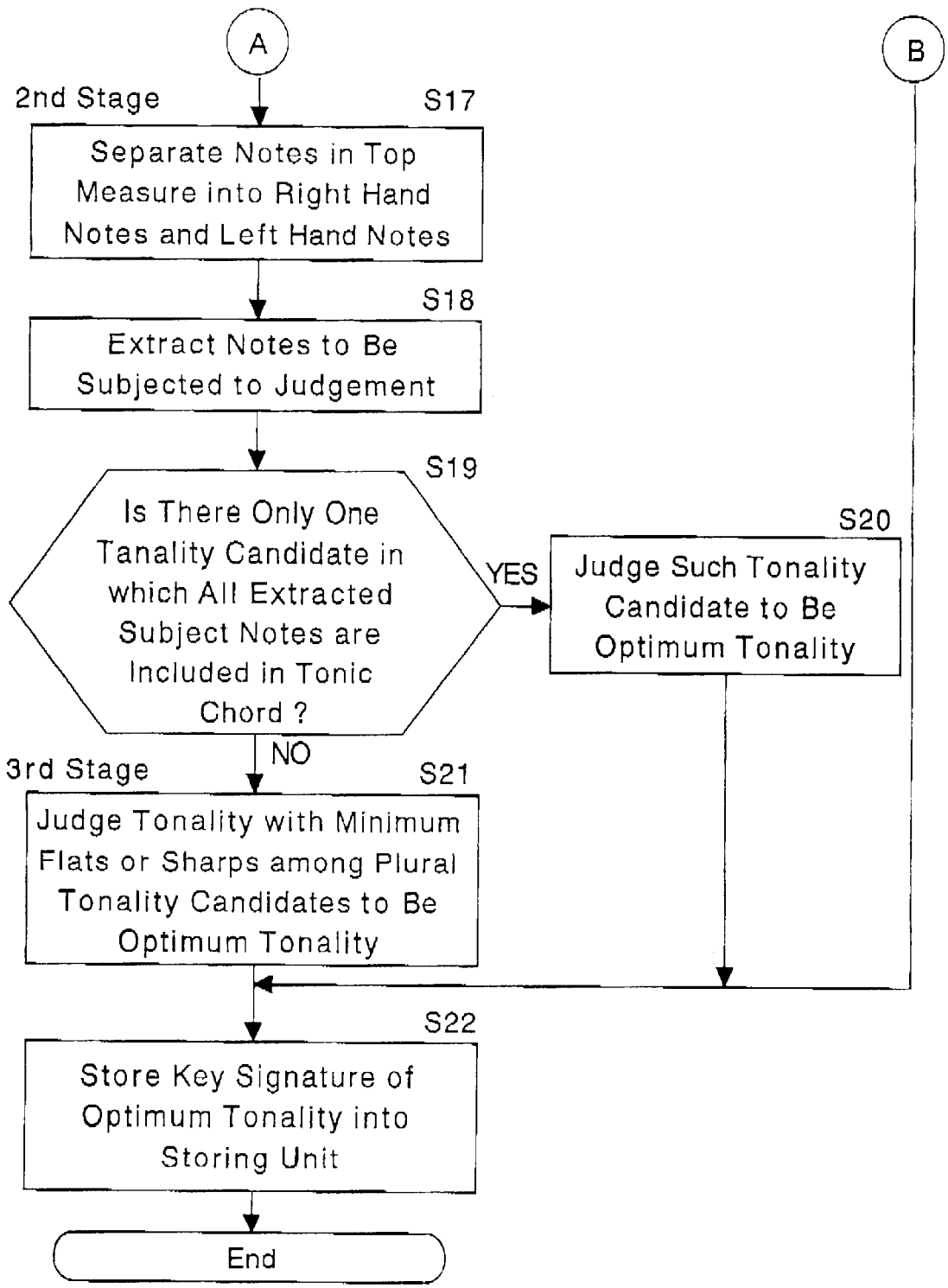
FIGS. 3a and 3b are, in combination, a flow chart describing the musical symbol determining process in an embodiment of the present invention.
Figures 4, 5:
FIG. 4 is a chart showing a specific example of a musical score subject to the musical symbol determination according to the present invention.
FIG. 5 is a chart showing the results of counting the number of intrinsic notes in the example of FIG. 4 as the first stage of the processing flow.
Figures 6, 7:
FIG. 6 is a chart showing another specific example of a musical score subject to the musical symbol determination according to the present invention.
FIG. 7 is a chart showing the results of counting the number of intrinsic notes in the example of FIG. 6 as the first stage of the processing flow.

Herein below, a process of determining a key signature will be described referring to FIGS. 3a–7, wherein FIGS. 3a and 3b, in combination, a flow chart describing the musical symbol determining process, FIG. 4 is a chart showing a specific example of a musical score subject to the musical symbol determination, FIG. 5 is a chart showing the results of the first stage computation for the example of FIG. 4, FIG. 6 is a chart showing another specific example of a musical score subject to the musical symbol determination, and FIG. 7 is a chart showing the results of the first stage computation for the example of FIG. 6.

To begin with, conditions for SMF (standard MIDI file) required in the music composition data file are described. The conditions required in the music composition data before determining the tonality key are:

(1) Metaevent of Key Signature

The metaevent of a key signature is defined in the SMF protocol, but in the case where a music composition data file does not contain such a key signature metaevent or the case where a music composition data file does contain a key signature metaevent but such a metaevent is not necessarily be reliable, the tonality of the music composition will be determined automatically in the present invention.

(2) Quantization

In the process of determining a key signature, it is necessary to judge whether the notes subject to judgment constitute a chord or not. Generally speaking, there may be some slight fluctuation in the clock timing, even in the case of a chord. An extreme case may be a "stroke" manipulation in playing the guitar. In such a case, a preliminary process is introduced to temporarily quantize the time points of the notes to be rounded to a certain length of period (a certain note length) to regard as concurrent occurrences in judging a chord for determining a key signature.

(3) Separation of Right Hand Notes and Left Hand Notes

It is preferable that an SMF data file is recorded using different MIDI channels for the right hand notes and the left hand notes, or is recorded on different tracks for the right hand notes and the left hand notes, so that the data of the right hand notes and the data of the left hand notes are separated from each other. Alternatively, in the case where the right hand notes and the left hand notes are not separated, the apparatus may be so constructed that the user may presume a split point between the right hand performance and the left hand performance in the scale and may input the split point designation manually to the musical symbol determining unit 1.

Now referring to FIGS. 3a and 3b, a detailed description is made about how a key signature is determined. The process includes three stages. If a key signature is uniquely determined in the first stage, the process is brought to its end. If a key signature is not determined uniquely in the first stage, the process moves forward to the second stage to determine a key signature, and if it fails, the process further moves forward to the third stage to determine a key signature. To begin with this process flow, a stage S11 reads out a music composition data set in the SMF format from the music composition data storing unit 2. Then, a step S12 is to adjust the fluctuation (dispersion) of the MIDI note-on event time points to quantize the event time points to be adequate for judging chords from the member notes. As was described above, the quantization process is necessary depending on the conditions of the inputted MIDI note-on events, and is not absolutely necessary. The quantized music composition data file may not necessarily be stored back into the storage unit 2.

In the first stage, a step S13 counts the number of the intrinsic notes in each of the twenty-four tonalities among the notes included in the judgment span of the music composition data file. The intrinsic notes herein termed are basically the notes which are expressed in the musical staff without using a temporary accidental mark (i.e. using only a key signature), and additionally a note expressed by using an accidental mark in each minor scale. The intrinsic notes and non-intrinsic notes (herein termed as extrinsic notes) are shown in the table of FIG. 2. A judgment span will be taken as, for example, eight measures for simple meters (e.g. a duple meter, a triple meter) and four measures for compound meters (e.g. a quadruple meter, a sextuple meter). In case of a music piece of an Auftakt start, the fractional measure will be complemented by the further succeeding measure. For example, in the case where the first measure which is fractional starts with the fourth beat, the four-measure span includes the first three beats of the fifth measure. The notes subject to judgment are all the notes existing in the judgment span, not distinguishing right hand notes and left hand notes.

A step S14 is to find a tonality having a maximum count of scale intrinsic notes. If there is a single tonality which has a maximum number of intrinsic notes among other tonalities, the process moves to a step S15 to judge such a single tonality to be an optimum tonality before skipping to a step S22. If there is not a single tonality having a maximum number of intrinsic notes, the process goes forward to a step S16 to select several tonalities as candidates before proceeding to a step S17 in the second stage.

FIGS. 4 and 5 show a first specific example of a musical score subject to the musical symbol determination, and the results of counting intrinsic notes in this example. The score of FIG. 4 is taken from Beyer's etude No. 80, and the number of intrinsic notes and the number of extrinsic notes in this score are counted by the step S13 with respect to each of the twenty-four tonalities according to the table of FIG. 2. FIG. 5 lists top ten tonalities having the greatest counts of the intrinsic notes among the twenty-four tonalities. As apparent from the table of FIG. 5, there is a single tonality that has the greatest number (=70) of intrinsic notes, i.e. D major with two sharps (♯) for the key signature. Thus, the step S14 judges "Yes" and the step S15 uniquely determines that the optimum tonality is D major, and then the step S22 stores the key signature having two sharps.

FIGS. 6 and 7 show a second specific example of a musical score subject to the musical symbol determination, and the results of counting intrinsic notes in this example. The score of FIG. 6 is taken from Beyer's etude No. 102, and the number of intrinsic notes and the number of extrinsic notes in this score are counted by the step S13 as in the case of the above first example. FIG. 7 lists top six tonalities having the greatest counts of the intrinsic notes. There are two tonalities that have the greatest number (=58) of intrinsic notes, i.e. Bb major with two flats (b) for the key signature and F major with one flat (b) for the key signature. Thus, an optimum tonality has not yet been determined uniquely.

In order to settle this situation, there may be a way of increasing the number of measures to extend the judgment span or a way of making the number of measures variable (selectable). In this example, if the span is extended by one more measure, an optimum tonality will be uniquely determined to be F major. In the example of the process flow of FIGS. 3a and 3b, however, a different way determines an optimum tonality out of the two tonalities, Bb major and F major, by proceeding to a second stage of process. According to the inventors' analysis about forty-four etudes in Beyer's etude book from No. 64 onward (introducing key signatures), there are thirty-one etudes whose key signatures are determined uniquely and correctly through the above-mentioned first stage process, twelve etudes for each of which two key signatures are found to be optimum, and one etude for which three key signatures are found to be optimum. On the other hand, with respect to Bach's twenty-four pieces for equal temperament" which include music compositions of all of the twenty-four tonalities, the first stage process in FIGS. 3a and 3b determines the tonalities uniquely and correctly about twenty-three of them. The judgment made was erroneous about only one of the twenty-four, i.e. No. 24 in B minor (Bm).

Now proceeding to the second stage, a step S17 sets the top measure of the music composition to be the judgment span. In the case where the note data for the right hand play and the note data for the left hand play are separately recognizable, the right hand notes and the left hand notes will be separately subjected to judgment. In the case where the note data are not recognizable separately for the right hand play and the left hand play, the judgment will takes place collectively with respect to all the notes. A step S18 extracts notes to be subjected to judgment from the judgment span. Then, a step S19 judges whether all of the extracted subject notes are included in the tonic triads of the above presented tonalities at the step S16 and if there is only one tonality that satisfies such a condition, the process goes to a step S20 to determine such only one tonality candidate to be the optimum tonality. If there is more than one tonalities whose tonic chord includes all the subject notes extracted at the step S18, the step S19 judges "No" and the process moves forward to a step S21 in the third stage.

Now a detailed description will be given as to how the steps S17 and S18 perform the judgments. In the second stage of the tonality determination process of FIG. 3, the notes which are the subjects of judgment are extracted according to the following conditions.

(1-1) The note event in question consists of a single note.

(1-2) The note event is succeeded by an event of a single note.

(1-3) The note interval between the note event in question and the succeeding note event is a minor third or wider interval.

(2) The note event in question constitute a chord.

As to the above conditions, every note event is judged whether the note event in question satisfy all the three conditions (1-1) through (1-3) concurrently, or the one condition (2). All of the notes at the note events which satisfy the judgment are extracted as the notes which are subject to judgment in the second stage.

The gist of judgment in the second stage is to compare the above extracted subject notes with the tonic triad constituent notes in each of the candidate tonalities as obtained through the first stage process. If all the extracted subject notes are included in the tonic triad constituent notes of any one candidate tonality, in other words, if none of the extracted subject notes are different from the constituent notes of such a tonic triad, the tonality which has such a tonic triad is the optimum tonality to be determined. In the case of Beyer's etude No. 102, the candidate tonalities selected through the first stage process are F major key and Bb major key, whose tonic triads are F major chord (consisting of F, A and C notes) and Bb major chord (consisting of Bb, D and F notes), respectively.

According to the second step process, the right hand notes in the top measure gives no particular tonality, while the top measure of the left hand part consists of three notes, F, A and C, which leads to an optimum tonality of F major key. The above second stage process is advantageous if chord tones and nonchord tones can be recognized from the melody motion based on the musical criteria. For this purpose, a melody portion has to be identified in the score. However, in the case where the right hand notes and the left hand notes are arranged in a mixed state, it will be difficult to separate the notes perfectly and therefore the accuracy of judgment will be degraded. From the example of Beyer's etude No. 102, the subject notes extracted are F, A, C, G, G♯ and Bb, and consequently there can be no triad that contains all of these notes as its constituent notes. Thus, no optimum tonality is found through the second stage process.

In the third stage processing, a step S21 judges the tonality with minimum flats or sharps among the extracted candidate tonalities to be an aimed optimum tonality. If the music compositions (tunes, songs, etc.) are limited to those pieces for the beginners, the third stage judgment is likely to give a good answer. In the case of a music composition whose tonality cannot be identified from the musical criteria, such as a music composition in a chromatic scale, the tonality of C major (the key signature is without a sharp nor flat) will be selected as the default (optimum) tonality. A step S22 stores the key signature of the determined optimum tonality into the storage device. The format for storage may be the SMF format including tonality metaevents.

A determination processing flow may not necessarily execute the third stage, and may be simplified to execute only the first stage, or up to the second stage. If there are plural tonalities remaining at the end of the first stage in the case with only the first stage, or at the end of the second stage in the case with the first and the second stage, there may be provided a simple selection rule such as a preference (priority) order in tonalities or any arbitrary selection to select one from the plurality of tonalities. Even such ways will make a fairly good determination.

Figure 8A:
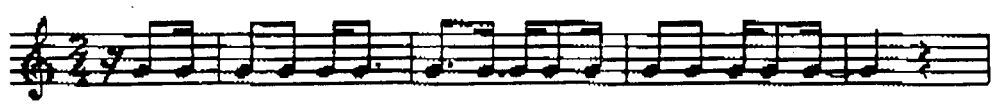
FIGS. 8a, 8b and 8c are charts showing examples of a musical score indicating chord names before transposition and after transposition.
Figure 8B:
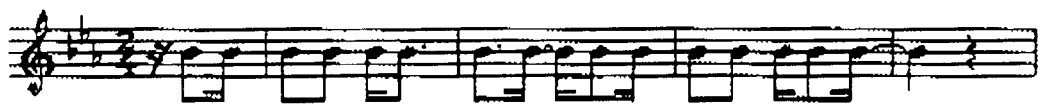
Figure 8C:
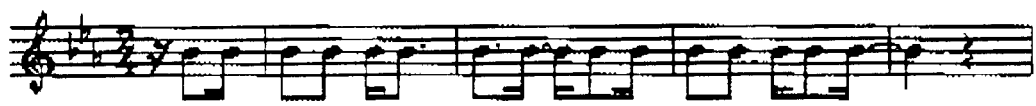

Now referring to FIGS. 8–10, a detailed description will be made with respect to the processing of determining chord names after transposition. As the chord names after transposition should be determined, taking the concept of tonality into consideration in order to avoid unnaturalness from a musical point of view, the present invention provides a particular process flow for automatically converting the chord names after transposition to adequate names. FIG. 8a shows an example of a musical score indicating chord names before transposition, and FIGS. 8b and 8c show examples of musical scores indicating chord names after transposition, in which FIG. 8b is one with adequate chord names while FIG. 8c is one with some inadequate chord names. FIG. 9 shows a flow chart describing the chord name determining process after transposition. FIG. 10 shows a lookup table of chord names in connection with transposition as used in the flow chart of FIG. 9.

FIG. 10 shows chord names with respect to fifteen key signatures corresponding to fifteen pairs of major and minor tonalities. The first column indicates indexes including tonality names from Cb major (Ab minor) to C♯ major (A♯ minor). Each relative minor key is placed in parentheses after each corresponding major key to constitute a single row for the sake of simplicity. Columns 2–13 indicate note names within an octave, where the top row denotes MIDI note numbers (from "60" through "71") for the middle octave, and the second row indicate note names of natural notes (white keys on a keyboard). As described herein before, the XF format permits chord names to be affixed to a music composition in recording the music data and in exhibiting a musical score. The chord names are expressed using the 31-note format covering natural notes (white keys) and altered notes with a sharp (♯), a double sharp (♯♯), a flat (b) and a double flat (bb), which expression system permits the distinction between the enharmonics.

On the other hand, the MIDI protocol is based on the 12-note equal temperament, and does not discriminate between enharmonics (such as C♯ and Db). While the 31-note expression system and the 12-note expression system are respectively closed within each system and are consistent in describing note names, the note names in one system and the note names in the other system do not have one-to-one correspondence. Thus, if the two systems are intermingled together in use, there may raise considerable confusion and complication. A typical case may be the case of transposition. For example, within the closed system of 31-note expression, the C♯ note as transposed by a major third interval upward will make a new note of E♯, the C♯ note as transposed by a diminished fourth interval upward will make a new note of F, the Db note as transposed by a major third interval upward will make a new note of F, and the Db note as transposed by a diminished fourth interval upward will make a new note of Gbb. It should be noted here that the C♯ note and the Db note are the same note in the 12-note expression system, and that the interval of a major third and the interval of a diminished fourth are the same interval having four semitones. Accordingly, the note number (key number) of "61" C♯4) as transposed by four semitones upward will make a new note number of "65" (F4).

However, if the original notes are expressed in the 31-note system and the transposition command is given by the 12-note system, a definite result will not be obtained. Likewise, if the original notes are expressed in the 12-note system and the transposition command is given by the 31-note system, a definite result will not be obtained, either. More specifically, there will be no definite answer for an adequate way of description, in the case the C♯ note is transposed by four semitones above, or in the case the note number "61" is transposed by a major third interval above. In order to obviate such perplexities, there may be two ways for solution.

(1) The position command should be described using the 31-note system (e.g. in terms of interval degrees), or (2) Conversion rules should be provided between the 31-note expression and the 12-note expression, from each to the other.

The above described discussions are applicable also to accidental signs affixed to notes in mid-course of a music score, and therefore the following solution will be basically useful for expressing accidental signs in connection with the notes. There are, however, some differences in aspects between the note names and the chord names in association with the accidental signs. Such differences will be discussed hereunder now.

(1) Note names with accidentals are to be converted from the 12-note system to the 31-note system using a lookup table as will be described later. On the other hand, chord names are to be arbitrarily inputted using the 31-note expression, and accordingly the 12-note expression/31-note expression conversion table may not always be usable. For example, even if a chord name of "Db7" in C major key may be inputted, there is no expression like "Db" in the 12-note system.

(2) A double flat sign (bb) and a double sharp sign (♯♯) are seldom used in the chord names, but should not be judged erroneous. In this connection, a double flat (bb) and a double sharp (♯♯) should be permitted to be used in the chord names as inputted, but should be obviated from the new chord names after transposition.

(3) Legibility may sometimes take priority over accuracy from a musical point of view, and accordingly coherency and consistency may not always be observed.

If the musical score piece of FIG. 8a is transposed three semitones (a minor third) higher, the last chord "Db7" should be "Fb7" as shown in FIG. 8c musically theoretically. As a chord name, however, the chord will be more easily understandable if it is expressed as "E7" using "E" in place of "Fb". As a matter of fact, the white key "E" is just below the white key "F", and therefore the direct expression of "E" is better understandable than the indirect expression of "the note a semitone below F". Similarly, the expression of "C" will be more easily understandable than the expression of "B♯". Legibility takes priority over theoretical preference in these situations. The second chord "Gb7", however, will not be expressed as "F♯7". In this situation, legibility will take priority only sometimes, while coherency will be observed basically.

The flow chart of FIG. 9 describes how the optimum chord names are determined after transposition. While the notes are, of course, shifted to other pitches by the transposition, a description of the transposition process of the notes is omitted herein. To begin with, a step S31 reads out the music composition data in the XF format which is an expanded SMF format from the music composition data storing unit 2. The notes and the chord names may be read out and processed one by one in the sequence of event occurrence tine points, or may be read out in a batch and stored in a buffer memory to be processed one by one thereafter.

In the XF format, a chord name is defined as one of the style messages and is expressed as follows (XF format specification V2.03):

FF 7F 07 43 7B 01 cr ct bn bt

In the above description, the byte "Cr" denotes a chord root note name and having a bit string structure of "0fffnnnn", wherein the one bit of "0" is an identifier, the three bits of "fff" indicates accidental signs (pitch alteration signs) and expresses "bbb" through "♯♯♯" (seven kinds of marks including a "no mark") by "000" through "110", and the four bits of "nnnn" indicates seven natural notes (white-key notes) "C" through "B" by "0001" through "0111". The byte "ct" denotes a chord type such as a major triad, a minor triad, a dominant seventh chord and a minor sixth chord. The byte "bn" denotes a non-root bass note name (sometimes referred to as an "on-bass note") and is used in the case of a non-root bass chord such as "Eb" of "Cm on Eb" (sometimes expressed as "Cm/Eb". The description thereof is the same as that of the chord root note name, where the no existence of non-root bass note is expressed by "01111111" ("127" in decimal notation). The byte "bt" denotes a bass chord type" and is described in the same way as the chord type, where the no existence of bass chord type is expressed by "01111111" ("127" in decimal notation).

A step S32 converts the description format of the chord root note and, if any, the non-root bass note of each of the chord names before the transposition into an expression of N=X+Y, wherein N is the note number (i.e. note name) of the chord root or the non-root bass in the MIDI expression, X is a note number of a white key (i.e. natural note) in the middle octave, and Y is an alteration amount (i.e. offset amount) in semitones.

(1) Alteration Amount Y

| Y | Alteration | | XF Definition |
|---|---|---|---|
| −3 | three flats | bbb | 0000nnnn |
| −2 | two flats | bb | 0001nnnn |
| −1 | one flat | b | 0010nnnn |
| 0 | non | natural | 0011nnnn |
| +1 | one sharp | ♯ | 0100nnnn |

| Y | Alteration | | XF Definition |
|---|---|---|---|
| +2 | two sharps | ♯♯ | 0101nnnn |
| +3 | three sharps | ♯♯♯ | 0110nnnn |

Among above, "bbb" and "♯♯♯" are not used in music and may be disregarded. Further, "bb" and "♯♯" are not used for chord names usually.

Basic Note X

The basic notes which are subject to pitch alteration are natural notes, notes of white keys on a keyboard. For the sake of simplicity in calculation in connection with the transposition, the basic notes are represented by the MIDI note numbers for the notes in the middle octave in this example, although they may be expressed by using all the note numbers 0 through 127.

| X | Note | XF Definition |
|---|---|---|
| 60 | C | 0fff0001 |
| 62 | D | 0fff0010 |
| 64 | E | 0fff0011 |
| 65 | F | 0fff0100 |
| 67 | G | 0fff0101 |
| 69 | A | 0fff0110 |
| 71 | B | 0fff0111 |

The above defined expression of N=X+Y as also expressed as N=(X,Y) in this specification, where N corresponds to the MIDI note number expressed in the 12-note expression, while X and Y represent note names in both the 12-note expression and the 31-note expression. X denotes a note number of a basic note before it is subjected to pitch alteration, and Y denotes an amount of alteration (offset). For example, C4 (the middle C note having a pitch frequency of 261.626 Hz) whose note number in the 12-note expression is "60" is expressed as C4=(60, 0), wherein X=60 represents the note C4 and Y=0 represents no-alteration. Thus, N=X+Y=60+0=60. For another example, Eb4 (the note a minor third above the middle C, having a pitch frequency of 311.127 Hz) whose note number in the 12-note expression is "63" is expressed as Eb4=(64, −1), wherein X=64 represents the note of E4 and Y=−1 represents an alteration by one flat. Thus, N=X+Y=64−1=63.

At a step S33, an amount of transposition is inputted by the user in terms of the number of semitones (S). A tonality after the transposition is determined from among the twenty-four tonalities at a step S34. The following rules are applied through the calculation steps from S34 to S39.

(1) The transposition amount S is added to X.
(2) Y (b or ♯) is not be-affected directly by S.
(3) Different processes are performed between the cases of Y=0 and Y<>0.

in the case of Y=0, the calculation is conducted similarly as the tonality.

Depending on the result of X+S, some different steps are introduce. In case the step S35 judges affirmative (YES), i.e. Y<>0, the process moves forward to the step S36. In the case of "No", i.e. Y=0, the process goes to the step S37. In the step S36, the result of the transposition is expressed as Ns=(X+S, Y). Then a judgment is made as to whether X+S falls on a black key (altered note whose note number is 61, 63, 66, 68 or 70) or not. When the judgment proves to be affirmative (YES), the process is directed to the step S38, while when the judgment proves to be negative (NO), the process is directed to the step S39. The step S38 is to adjust the description format to be a white key (i.e. natural note) number (60, 62, 64, 65, 67, 69 or 71)+an alteration amount. Namely, if Y is positive (in this case "+1"), "1" is added to X+S and "1" is subtracted from Y, and if Y is negative (in this case "−1"), "1" is subtracted from X+S and "1" is added to Y, thereby keeping the Ns value unchanged.

For example, in the case where the chord Eb is transposed three semitones above (S=3), N=(64, −1) before the transposition, and Ns=(67, −1) after the transposition. In this case, as X=67, which means a natural note or white key, the process moves to the step S39. For another example, in the case where the chord Eb is transposed one semitone below (S=−1), N=(64, −1) before the transposition, and Ns=(63, −1) after the transposition. In this case, as X=63, which means an altered note or black key, the process moves forward to the step S38. As Y<1, the note number X for a basic note is adjusted by X+S−1=64−1−1=62, and the alteration amount is adjusted by Y+1=−1+1=0. Thus, the chord name after the transposition is Ns=(62, 0).

When X+S falls on a white key, i.e. when the step S36 judges negative (NO), no further adjustment would be necessary. But for the purpose of better legibility, the step S39 is inserted for improving the expression format in this embodiment. As described before with reference to FIGS. 8a, 8b and 8c, the chord names tend to give priority to legibility over coherency contrary to the note names with accidentals. The chord names Fb and B♯ are usually be substituted by E and C, respectively. The step S39 realizes such legibility in the chord name description, taking the usual habit into consideration, as follows.

If X+S=65 and Y<0, then X+S=64, Y=Y+1; and
If X+S=71 and Y>0, then X+S=60, Y=Y−1.

Similarly, the chord names E♯ and Cb may be adjusted to be consistent with the cases of Fb and B♯. But in the actual practice in the art, such names are acceptable.

On the other hand, when the step S35 judges "NO", i.e. there is no alteration or offset (Y=0), the process goes to the step S37. In this situation, a table of note alteration rules for accidentals (as will be explained later) may be usable from a theoretical point of view. But for the sake of legibility of the chord names, double accidentals like ♯ and bb should better be avoided. In this connection, the table of note alteration rules for accidentals has been modified partly to provide a table of chord names in relation to transposition as shown in FIG. 10. The result of calculation of X+S will be determined according to this table of FIG. 10 after the new chord name after the transposition has been obtained. The chord names are listed in this table both for major chords and minor chords in common.

Some specific examples will be described hereunder about how the table of chord names in relation to transposition is used.

EXAMPLE 1

The case where the chord name C7 in C major tonality (German name: C) is transposed three semitones upward:
The chord root before the transposition is "C" and accordingly N=(60, 0).
After the transposition, Ns=(63, 0).
The new tonality after the transposition is Eb (German name: Es) major which is three semitones above the original tonality "C major" to be referenced in the table of FIG. 2.
Then in FIG. 10, the cell at the intersection of the row of Eb major tonality and the column of MIDI note number 63 indicates the name of "Eb". As Eb is (64, −1), the Ns expression is determined as Ns=(64, −1). Thus, C7 chord becomes Eb7 chord after the transposition.

EXAMPLE 2

The case where the chord name C7 in Ab major tonality (German name: As) is transposed one semitone upward:
The chord root before the transposition is "C" and accordingly N=(60, 0).
After the transposition, Ns=(61, 0).
The new tonality after the transposition is A major (German name: A) which is one semitone above the original tonality "Ab major" to be referenced in the table of FIG. 2.
Then in FIG. 10, the cell at the intersection of the row of A major tonality and the column of MIDI note number 61 indicates the name of "C♯". As C♯ is (60, 1), the Ns expression is determined as Ns=(60, +1). Thus, C7 chord becomes C♯7 chord after the transposition.
A non-root bass (on-bass) note name is determined similarly.

EXAMPLE 3

The case where the chord Cm on Eb in G major tonality (German name: G) is transposed one semitone upward:
The chord root before the transposition is "C" and accordingly N=(60, 0).
After the transposition, Ns=(61, 0).
The new tonality after the transposition is Ab major (German name: As) which is one semitone above the original tonality "G major" to be referenced in the table of FIG. 2.
Then in FIG. 10, the cell at the intersection of the row of Ab major tonality and the column of MIDI note number of 61 indicates the name of "Db". As Db is (62, −1), the Ns expression is determined as Ns=(62, −1). Thus, Cm chord becomes Dbm chord after the transposition. With respect to the non-root bass (on-bass) note, however:
The non-root bass before the transposition is "Eb" and accordingly N=(64, −1).
After the transposition, X+S=65 and Y<>0, and the process runs through the steps S35, S36 and S39 to obtain the result of Ns=(64, 0) which means E note. Collectively, the new chord name is determined to be Dbm on E. As to the expression in the XF definition, such expression can be obtained easily from the Ns expression. In the case of Dbm on E:

|  | After Transposition |  | XF definition |
|---|---|---|---|
| Chord root | Db | Ns = (62, −1) | 0010—0010 |
| Chord type |  |  | unchanged |
| Non-root bass | E | Ns = (64, 0) | 0011—0011 |

Thereafter, a step S40 in FIG. 9 stores the music composition data having converted chord names which have been determined according to the above processes into the storing unit 2.

Now the process of determining a chord name (including a chord root and a non-root bass) is summarized herein below. An amount of transposition is given in terms of the number of semitones. A chord name after transposition is to be determined according to a predetermined rule such as selecting from among the twenty-four tonalities listed in FIG. 2, in which the one which has a less number of flats or sharps out of an enharmonic pairs is to be selected. For example, a major chord having a root note of the MIDI note number of 63 is determined to be Eb major expressed with three flats, rather than D♯ major which is to be expressed with nine sharps theoretically. When a chord name is inputted in the XF format, a chord root and a non-root bass are converted into an Ns=(X, Y) format for easy calculation about a transposition A chord name is adjusted appropriately according to legibility, the basic rule for chord names. After the transposition, the Ns=(X,Y) format is to be converted back to the XF format again. Although the above explained process is coherent from a theoretical point of view, but may include some inconvenience or unnaturalness in chord name expressions especially in cases of key signatures with many sharps or flats. This is due to the legibility-first rule. As a compromise, chord names which appear unacquainted may be renamed to more acquainted names.

In the above description, the process flow of FIG. 9 determines a chord root and a non-root bass using algebraic formulae in the steps S36, S38 and S39 and using a lookup table in the step S37, but the chord root and the non-root bass may be determined using only tables in all the steps. Alternatively, they can be obtained using only algebraic formulae, as there is certain regularness in the lookup table of FIG. 10.

Next referring to FIGS. 11–13, an explanation will be made with respect to the automatic determination of accidental signs. An SMF file itself does not contain information about accidental notes (flatted notes or sharped notes), as all the notes are identified by the note numbers according to the 12-note MIDI protocol. However, if the music composition data file is to be exhibited or displayed according to the 31-note system expression, accidental signs should be introduced to represent accidental notes. In this connection, FIGS. 11a–11d show how the accidental notes are expressed based on the 12-note expression, wherein the table of FIG. 11a shows an original rule for the notes altered by accidentals, the musical score of FIG. 11b shows an example as expressed in accordance with the rule of FIG. 11a, the musical score of FIG. 11c shows an example as expressed in accordance with a modified rule, and the table of FIG. 11d shows a modified rule for notes altered by accidentals separately prepared for a major scale and a minor scale. FIG. 12 shows a flow chart describing a process of automatically determining the accidentals. FIGS. 13a and 13b show lookup tables of note names (also applicable to chord names) in connection with transposition prepared separately for major scales and minor scales by applying the modified rules of FIG. 11d to the lookup table of FIG. 10.

The tables of FIGS. 11a and 11d respectively show the original rule and the modified rule of how each of the accidental notes is expressed in connection with the associated diatonic scale note. The table of FIG. 11d contains separate rules for the major scale and the relative minor scale. In the tables, mark "0" means no alteration from the diatonic scale note, mark "+" means upward semitone alteration from the lower adjacent diatonic scale note, and mark "−" means downward semitone alteration from the upper adjacent diatonic scale note. The upward alteration does not necessarily mean a single sharp sign. If the scale note has been already sharped by the key signature, the upward accidental alteration sign should be a double sharp and the downward accidental alteration sign should be a natural mark, while if the note has been already flatted by the key signature, the upward accidental alteration sign should be a natural mark and the downward accidental alteration sign should be a double flat. For the sake of convenience, the degree names of the scale notes are expressed for the major scale in the tables of FIGS. 11a and 11d. Therefore, it should be understood, for example, the submediant of the major scale corresponds to the tonic of the relative minor scale and the semitone raised dominant corresponds to the leading note (or subtonic) of the relative minor scale.

More specifically, the note at the "+" mark is expressed by affixing a sharp sign to the left adjacent note, while the note at the "−" mark is expressed by affixing a flat sign to the right adjacent note. For example, the note between the tonic and the supertonic is expressed by affixing a sharp to the note name of the tonic, and the note between the supertonic and the mediant is expressed by affixing a flat sign to the note name of the mediant. As explained above, the notes already raised or lowered by the key signature should be expressed accordingly, using a ♯ sign, a bb sign or a natural mark.

The G major scale, as an example, contains seven diatonic scale notes, i.e., seven intrinsic notes G, A, B, C, D, E and F♯, wherein G is the tonic, A the supertonic, B the mediant, C the subdominant, D the dominant, E the submediant, and F♯ the subtonic or leading note. According to the original rule in the table of FIG. 11a, the twelve notes of an octave are: G (tonic), G♯, A (supertonic), Bb, B (mediant), C (subdominant), C♯, D (dominant), D♯, B (submediant), F natural, and F♯ (subtonic). The F natural note is a flatted F♯, with a flat and a sharp are canceling each other. The table of FIG. 11d is similarly applicable.

The original rule of FIG. 11a for note alteration by the accidentals indicates that the tonic, the supertonic, the mediant, the subdominant, the dominant, the submediant and the subtonic are not subjected to alteration by an accidental, as they are inherently controlled by the key signature. The note which is a semitone above the tonic is expressed by the upward alteration of the tonic by an amount of a semitone. The note which is a semitone above the supertonic is expressed by the downward alteration of the mediant by an amount of a semitone. The note which is a semitone above the subdominant is expressed by the upward alteration of the subdominant by an amount of a semitone. The note which is a semitone above the dominant is expressed by the upward alteration of the dominant by an amount of a semitone. The note which is a semitone above the submediant is expressed by the downward alteration of the subtonic by an amount of a semitone. FIG. 11b shows a part of the score of the music piece "For Elise" (in Am tonality) as described according to the FIG. 11a rule. The reader will feel some queerness in this score, as it is a bit different from the usually prevailing one. In order to improve this queerness, the table of FIG. 11a is a little bit modified to obtain the table of FIG. 11d, in which the note between the supertonic and the mediant (both as viewed in the major scale) is to be obtained by raising the lower adjacent note. Thus modified musical score is shown in FIG. 11c, about which the reader will not feel queer.

According to the modified table of FIG. 11d, however, if the minor scale rule is applied to a music piece titled "Parade of Elephant Calves" in C major (the score not shown), the described top four measures will give some queer sensation. In this connection, if the original rule of FIG. 11a is modified also for the major scale to obtain further revised rule for the major scale, by changing the alteration direction of the note between the dominant and the submediant from "+" to "−", then the described score will be free from such queerness.

FIG. 12 describes a process of automatically determining accidentals. In FIG. 12, a step S51 reads out a music composition data file having information on the key signature and the major/minor designation (musical mode designation). The "tonality metaevent" in the SMF format is "FF 59 02 sf mi" consisting of five bytes. The byte "sf" represents the tonality and indicates the number of sharps or flats, where the flats are expressed in negative numbers. The number of sharps or flats for the key signature tells the tonality. The byte "mi" represents the major/minor distinction, where "mi=0" means the major tonality and "mi=1" means the minor tonality. A step S52 identifies the tonality with the major/minor distinction. A step S53 looks up the table of FIG. 11d with respect to the identified tonality with the major/minor distinction and determines the optimum accidentals for the necessary notes. A step S54 stores the music composition data file having necessary accidental signs affixed to the corresponding accidental notes. It may be difficult to determine the adequate accidental signs perfectly based on the tonality, but such a table that contains separate rules for the major scale and the minor scale will provide fairly correct answers.

In the above description, the adequate accidental signs are determined using the table of FIG. 11d. Alternatively, however, the same or similar results will be obtained by other ways such as by calculating the accidentals to be affixed based on the information about the key signature, the major/minor distinction and MIDI numbers, or by preparing and using a special table which directly tell the accidental signs in accordance with the MIDI numbers. Incidentally, an accidental sign is effective within a limited range under the musical grammar. Generally speaking, an accidental sign is effective to the note to which it is affixed to and to the same pitched notes thereafter within the same measure, and will not be effective beyond the bar line over to the following measures, except the case of the same pitched notes combined by a tie sign bridging two contiguous measures.

Thus, notes which need an accident sign are to be determined in accordance with the effective range of the accidental sign. In this connection, there is a situation where a note with an accidental sign is determined from the table but such a note does not need an accidental sign any more because it is within the effective range of the preceding accidental sign. On the contrary, there is a situation where a note without an accidental sign is determined from the table but such a note needs a canceling accidental sign because it is within the effective range of the preceding accidental sign. For example, in FIG. 11c, there is a natural sign affixed to the fifth note (D5) in the second measure to cancel the effect of the preceding sharp sign affixed to the second note (D#5) in the same measure. Supplementally, the rule about the effective ranges is not very strictly or limitatively applied, but a redundant accidental may sometimes be affixed to the note within or outside the effective range of the preceding accidental sign for the sake of legibility or understandability. For example, in FIG. 11b, there is a natural mark affixed to the first note in the second measure where the effect of the flat sign in the preceding measure no longer extends. This natural sign is depicted here as a kindness to the reader so that the reader should not mistake in the playing. In order to depict the music score with bar lines between the measures, the bar line positions or partitions between the measures are determined based on the time signature metaevent in the SMF format data and the durations of the respective notes.

Figure 14:
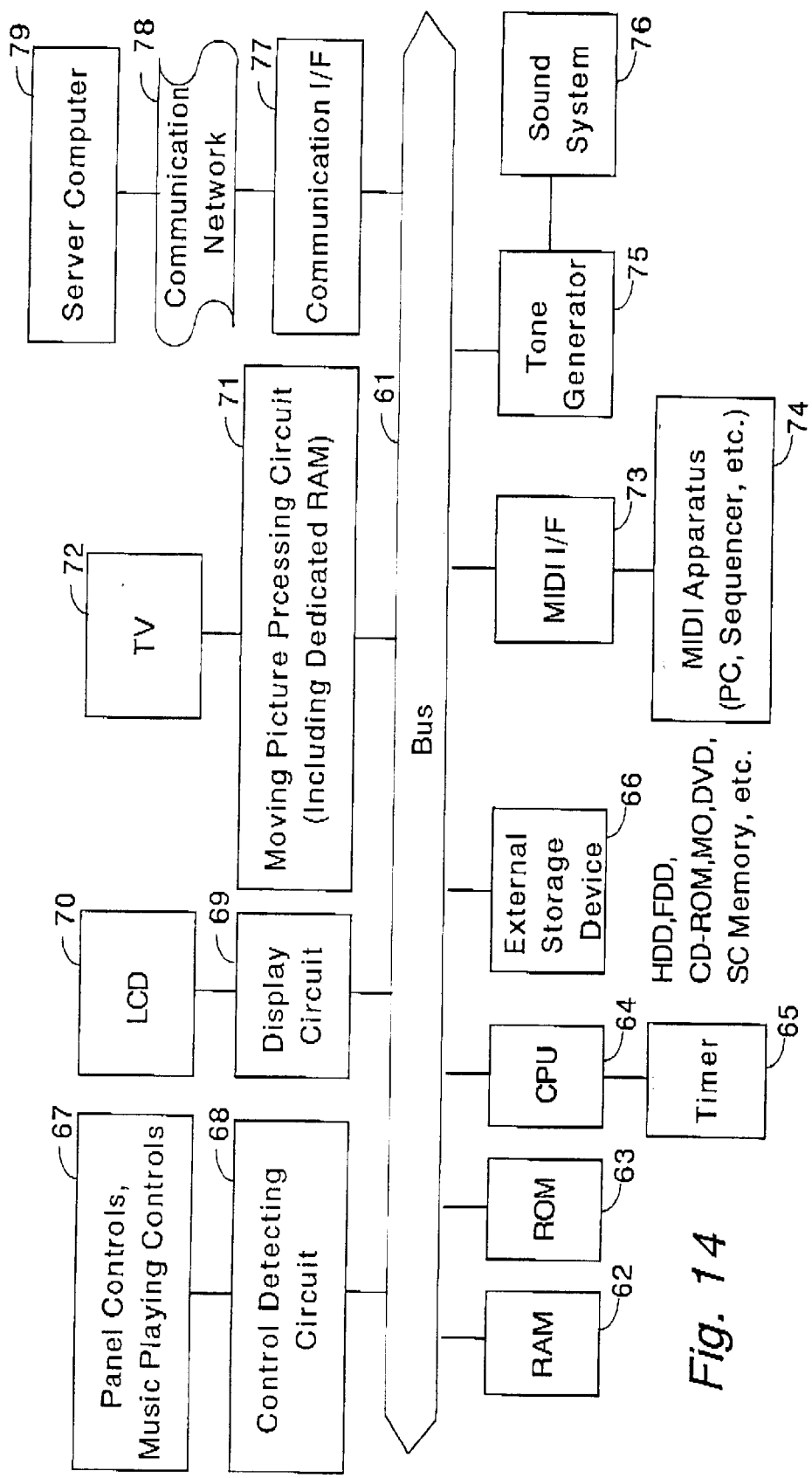
FIG. 14 is a block diagram showing the hardware structure of an embodiment of the present invention.

FIG. 14 is a block diagram showing the hardware structure of an electronic musical apparatus as an embodiment of the present invention. The apparatus comprises respective circuit blocks connected with each other via a bus 61 for transferring the addresses and data for the data processing. The numeral 62 denotes a RAM (random access memory), 63 a ROM (read only memory) and 64 a CPU (central processing unit). The CPU 64 undertakes the general input/output control and the memory administration in the musical apparatus, and transmits the performance data as created by music playing controls and panel controls 67 (such as keys on the keyboard and switches on the panel), the automatic performance data as inputted from external apparatuses or read out from the storing unit (such as external storage device 66 or the ROM 63) to a tone generator 75, which in turn outputs tone signals to be sounded via a sound system 76 including a loudspeaker. The automatic performance data are processed in various manners. The processing rate may be varied according to the tempo set by the user. The processing rate may be kept constant, and the values of the timing data in the automatic performance data are varied according to the set tempo. The processing rate may be kept constant, and the counting rate of the timing data in the automatic performance data is varied according to the tempo in the processing at a time.

The ROM 63 stores the programs for operating the CPU 64 (including the steps of executing the processing for automatically determining the musical notational signs based on the music composition data), the preset tone color data and the musical composition data. The RAM 62 includes memory regions for working areas necessary for the execution of the CPU 64 based on the programs, and buffer regions for various inputted data. A timer 65 supplies the clock sign to the CPU 64 and also controls the interrupt timing.

The external storage device 66 may be of any type such as a hard magnetic disk drive (HDD), a flexible magnetic disk drive (FDD), a CD-ROM drive, an MO (magneto-optical disk) drive, a DVD (digital versatile disk) drive, and a semiconductor memory like a flash memory. The external storage device 66 also stores the preset tone color data and the musical composition data. Further, the program for operating the CPU may also be installed therein. A semiconductor memory may be of a detachable type for a portable use off from the electronic musical apparatus.

The panel controls and music playing controls 67 are for inputting user's operations on the musical apparatus, and a control detecting circuit 68 detects the controlling operations given to the controls 67. The panel controls are controls arranged on the instrument panel of the electronic musical apparatus for various setting and designating operations. The music playing controls are keyboards, foot pedals, drum pads, and so forth. Some type of electronic musical instrument may not include music playing controls.

A display circuit 69 is to provide video signals to be displayed on a liquid crystal display 70 which is arranged on the panel board of the apparatus. A moving picture processing circuit 71 is to process data for moving pictures and includes dedicated RAM therein. A television (TV) 72 is to display the pictures based on the video signals produced by the moving picture processing circuit 71, and may be a home-use television set, or a monitor TV, or a video projector connected to the electronic musical apparatus. The liquid crystal display device 70 and the television 72 is used for exhibiting various messages and pictures when various settings are made by the user or for exhibiting a musical score of the automatically played music composition. The musical apparatus of the present invention may be provided with various operation modes, for example a mode in which the automatic performance is played back as sound signals and is emitted as audible sounds from the sound system 76, and a mode in which a performance part (typically a melody part) is muted from the sound playback and the musical score of the muted part is exhibited on the liquid crystal display 69 or the TV 72 so that the user can play or practice that part of the music with the accompaniment by the remaining parts by reading the displayed musical score.

The apparatus is provided with a setting control for the user to manually designating a key signature in the edit mode of the apparatus. When the key signature is manually designated, the key signature is added to the music composition data file stored in the RAM 62 included in the apparatus, as well as the accidental signs in the music composition data will be rewritten as is already practiced in a sequencer software. The result of such key signature designation and accidental sign determination are reflected in the music score being displayed on the liquid crystal display device 69 or on the TV 72, thereby realizing a real-time up-to-date musical score. The key signature may be inputted in the mid course of the music progression. Further, designation of the major/minor distinction may be inputted manually.

The apparatus may further be provided with a switch for designating chord name exhibit/unexhibit conditions so that the user can cancel the chord names from the displayed musical score in case there is no need of chord name display or in case there is some doubt about the musical accuracy in the chord names contained in the music composition data file. More specifically, the apparatus may be provided with a switch to designate the selective display of the chord names in the musical score on the liquid crystal display 70 without displaying the chord names in the musical score on the TV 72. Then, an instructor watches the LCD 70, while the student watches the TV 72 so that the student can guess correct chords (either before or after transposition) in learning. Similar arrangement may be provided concerning the key signature and the accidentals such that the selective display of the key signature and the accidentals may be possible with the LCD 70 and the TV 72, so that the student learn the correct use of those musical symbols.

A MIDI interface 73 is provided to connect external MIDI apparatuses 74 such as a personal computer PC and a sequencer. The MIDI interface may not necessarily be a dedicated one, but may be arranged using another general purpose interface such as an RS-232C, a USB (universal serial bus) and IEEE1394. Further, the arrangement may be so prepared that various data other than the MIDI messages can be transmitted together. The tone generator 75 receives via the bus 61 the player's performance data inputted from the music playing controls 67, the performance data transmitted from the external MIDI apparatus 74, or the automatic performance or accompaniment data stored in the ROM 63, and produces musical tone signals in tone colors designated by the tone color data stored in the ROM 63. The produced tone signals are emitted from the sound system 76. The tone generator 75 may be constructed by dedicated hardware and also may be configured by using a DSP (digital signal processor) and a microprogram, and further may be configured by the CPU 64 and a software tone generator program.

A communication interface 77 is to connect the apparatus to an external communication network 78 such as a LAN (local area network), a subscriber's telephone line, a cellular phone line and the Internet. The communication interface 77 may be either for wired communication or wireless communication, or for the both. A server computer 79 is connected to music composition databases in most cases. The user of the apparatus of the present invention can download desired music composition data files from the server computer 79 to the external storage device 66. The music composition data from the server computer 79 may be played back by the apparatus in stream. The LCD 70 and the TV 72 can display the musical score of the downloaded music composition data file. The performance data played on the musical apparatus or the music composition data created in the musical apparatus may be transmitted to a personal computer or a cellular phone terminal (not shown) on the communication network 78 so that the transmitted data can be downloaded to the storage device or can be played back from the loudspeaker in such a personal computer or cellular phone terminal. A further arrangement may be provided such that the personal computer or the cellular phone terminal may exhibit the musical score on its display panel based on the received data or may print out such a musical score by means of a printer.

In the above description, the file format of the music composition data is the SMF format, and the XF format which is an expanded SMF format and contains the chord names. The data format for the music composition data, however, may not necessarily be limited to these formats, and may be of another format like an individual format of a sequencer such as the DOC format and the XWS format as long as the necessary data are contained therein. The data format for the musical performance data may be any type of prevailing formats including the "event+relative time " type which represents the time point of an event by a time lapse from the preceding event, the "event+absolute time" type which represents the time point of an event by an absolute time point in each measure or the entire music piece, the "note (rest) event+duration" type which represents a note by the pitch (rest) and the duration, and the "direct memory mapping" type in which memory regions are secured (allotted) for all the available time points under the minimum resolution of time progression for the music and each event is written at a memory region which is allotted to the time point for such each event. The data storage protocol for the automatic performance data arranged in plural channels may be one which stores the data for the plural channels in an intermingled state or may be another which stores the data for each channel in each allotted recording track separately.

In order to incorporate accidental signs into a deliverable music composition data file rather than to limit the use within the own apparatus, the accidental signs have only to be defined as independent MIDI events in the data protocol. Alternatively, the accidental signs may be recorded on a track chunk of the XF information or on a newly provided track chunk, just as the chord names in the XF format are recorded on the track chunk of the XF information as metaevents of a kind of style messages.

Although the above description has been made with respect to score examples of piano music pieces to be used for an electronic piano, the musical instrument may not necessarily be limited thereto. The electronic musical instrument may be of a keyboard type as explained above, and also may be of a stringed instrument type (guitar, bass or else), a wind instrument type, a pitched percussion instrument type, or else. The present invention is applicable to the display of a musical score having musical notational symbols such as a key signature, accidental signs and chord names using alteration marks in the musical score notation for respective particular instruments. The apparatus is not necessarily limited to an electric musical instrument which comprises a built-in tone generator, automatic performance unit, etc., but may be configured by connecting separate devices by communication means such as MIDI cables and various networks to constitute a system of the present invention. In this connection, an electronic musical instrument which is available only for players' performances thereon, an electronic musical instrument which is capable of outputting tone signals only, and a personal computer in which sequencer software is installed are also useful for the present invention. The function of exhibiting musical scores based on automatic performance data may be added to an acoustic automatic player piano to realize the present invention.

Any apparatus which is equipped with a display screen for exhibiting musical scores will be useful for the present invention. For example, a PDA (personal digital assistant), a game machine (of home use type or arcade use type), a karaoke apparatus, a cellular phone terminal, a house telephone terminal, a home-use information apparatus (e.g., television receiver), and so forth equipped with an internal computer will be useful for the present invention. A computer of a workstation type exclusively for printing musical scores may be useful, too. An electronic musical instrument or an apparatus may not necessarily be self-completed in function, but a client-server system may be configured by electronic musical instruments and apparatuses as the communication terminals, and a server provided with part of the function of automatically judging and determining alteration marks based on the music composition data. The program and various data to be used for automatically determining musical notational symbols based on the music composition data may be stored in the ROM and also may be supplied from an external storage device or from a remote apparatus such as a server computer to an electronic musical instrument or a personal computer via a communication interface.

As will be understood from the above detailed description, the present invention provides an apparatus and a method for automatically determining musical notational symbols which determines musically adequate key signatures and exhibit adequate musical scores according to the determined key signatures, even where the musical composition data having no key signature information is inputted to the apparatus. According to the present invention, the hit ratio is high with respect to music composition data for beginners such as piano etudes, and therefore adequate key signatures will be given to the existing music pieces for children education and the original music pieces composed by instructors or students. An instructor can teach the students how to write or read or play a musical score using adequate key signatures, and the students can learn the same. The invention is advantageous in adequately exhibit chord names after transposition. The invention is also advantageous in affixing adequate accidental marks for tonalities and minor tonalities, respectively.

While several forms of the invention have been shown and described, other forms will be apparent to those skilled in the art without departing from the spirit of the invention. Therefore, it will be understood that the embodiments shown in the drawings and described above are merely for illustrative purposes, and are not intended to limit the scope of the invention, which is defined by the appended claims.

What is claimed is:

1. An apparatus for determining musical notational symbols based on musical composition data, comprising:

a music composition data storing device which stores music composition data representing a length of music containing a progression of notes;

a music data readout device which reads out said music composition data;

a first selecting device which counts the number of notes which are intrinsic to each of a predetermined plurality of tonalities among the notes contained in a selected span of said length of music, and selects a single optimum tonality or plural tonality candidates based on the counted number of intrinsic notes with respect to each tonality according to a first selection rule;

a second selecting device which extracts notes to be subjected to judgment from among a top sub-span of said selected span, examine whether there is a single tonality whose tonic chord includes all of said extracted subject notes among said plural tonality candidates, and, if and only if there is, selects said single tonality to be an optimum tonality;

a third selecting device which selects a tonality having a least number of accidental signs among said plural tonality candidates to be an optimum tonality; and a key signature determining device which determines a key signature for said optimum tonality selected by any one of said first, second and third selecting devices.

2. An apparatus for determining musical notational symbols according to claim 1, further comprising:

a key signature write-in device which writes said determined key signature, into said music composition data storing device.

3. An apparatus for determining musical notational symbols according to claim 1, further comprising:

a key signature designating input device for inputting a key signature by a user's operation to designate said key signature; and a key signature altering device which alters said key signature determined by said key signature determining device to said inputted key signature.

4. An apparatus for determining musical notational symbols based on musical composition data, comprising:

a music composition data storing device which stores music composition data representing a length of music containing a progression of notes, together with chord names and a tonality expressed with enharmonic discrimination, each of said chord names being identified by a chord root and a chord type, said chord root being expressed by a name of a basic note plus an amount of pitch alteration;

a music data readout device which reads out said music composition data including the notes, the chord names and the key signature;

a transposition designation input device which designates an amount of transposition in terms of the number of semitones;

a chord root shifting device which shifts said chord roots by shifting the names of the respective basic notes by said amount of transposition and obtains transposed chord roots each of which is expressed by a shifted basic note plus said alteration amount;

a first chord root determining device which, in the case where said alteration amount is not zero and said shifted basic note becomes a note expressed by a natural note plus an accidental sign and falling on an accidental note, converts the expression of said shifted basic note to an expression of a natural note which is adjacent to said shifted basic note in the direction of alteration by said accidental sign and adjusts said alteration amount by the amount and in the reverse direction of the conversion of said shifted basic note to obtain a transposed chord name;

a second chord root determining device which, in the case where said alteration amount is not zero and said shifted basic note becomes a note expressed by a natural note plus an accidental sign and falling on a natural note, converts the expression of said shifted basic note to an expression of said natural note on which said shifted basic note falls and adjusts said alteration amount by the amount and in the reverse direction of the conversion of said shifted basic note to obtain a transposed chord name;

a third chord root determining device which, in the case where said alteration amount is zero, determines the expression of said shifted basic note in view of the tonality after the transposition to obtain a transposed chord name; and a chord name rewriting device which rewrites chord names contained in said stored music composition data according to said transposed chord name obtained by said first, second or third chord root determining device.

5. An apparatus for exhibiting a musical score based on musical composition data, comprising:

a music composition data providing device which provides music composition data representing a length of music containing a progression of notes;

a display device which displays a music score based on said music composition data;

a tonality determining device which determines an optimum tonality by examining said music composition data to find, with respect to each of plural tonalities, how many notes as represented by said music composition data are contained in said each tonality and by determining an optimum tonality based on said examining; and a display control device which controls said display device to display said music score according to said optimum tonality.

6. An apparatus for exhibiting a musical score according to claim 5, further comprising:

a chord name exhibit/unexhibit designating device which designates whether or not to exhibit chord names on the music score being displayed; and a chord name exhibit controlling device which controls said display device to exhibit or not to exhibit the chord names on the music score according to the designation.

7. An apparatus for exhibiting a musical score based on musical composition data, comprising:

an apparatus for determining musical notational symbols according to any one of claims 1–4;

a display device;

a chord name exhibit/unexibit designating input device; and a display controlling device which controls said display device to exhibit a musical score with the chord names when said music composition data contains chord names and said chord name exhibit/unexhibit designating input device is designating the exhibit condition, and controls said display device to exhibit a musical score without the chord names when said chord name exhibit/unexhibit designating input device is designating the unexhibit condition.

8. An apparatus for determining musical notational symbols based on musical composition data, comprising:

a music composition data storing device which stores music composition data representing a length of music containing a progression of notes together with a key signature and a major/minor designation;

a music data readout device which reads out said music composition data;

an accidental sign determining device which determines what accidental signs to be affixed to which of said notes according to the note name, the key signature and the major/minor designation; and an accidental sign affixing device which affixes each of said determined accidental signs to the note to which said each determined accidental sign is to be affixed.

9. An apparatus for determining musical notational symbols according to claim 8, further comprising:

an accidental sign write-in device which writes, into said music composition data storing device, said accidental signs affixed to the notes in correspondence to the notes in said music composition data.

10. A method for determining musical notational symbols based on musical composition data, said method comprising:

a step of reading out, from a storing device, music composition data representing a length of music containing a progression of notes;

a step of counting the number of notes which are intrinsic to each of a predetermined plurality of tonalities among the notes contained in a selected span of said length of music;

a first selecting step of selecting a single optimum tonality or plural tonality candidates based on the counted number of intrinsic notes with respect to each tonality according to a first selection rule;

a step of extracting notes to be subjected to judgment from among a top sub-span of said selected span;

a step of examining whether there is a single tonality whose tonic chord includes all of said extracted subject notes among said plural tonality candidates;

a second selecting step of selecting, if and only if there is such a single tonality, said single tonality to be an optimum tonality;

a third selecting step of selecting a tonality having a least number of accidental signs among said plural tonality candidates to be an optimum tonality; and a step of determining a key signature for said optimum tonality selected by any one of said first, second and third selecting steps.

11. A method for determining musical notational symbols based on musical composition data, said method comprising:

a step of reading out, from a storing device, music composition data representing a length of music containing a progression of notes, together with chord names and a tonality expressed with enharmonic discrimination, each of said chord names being identified by a chord root and a chord type, said chord root being expressed by a name of a basic note plus an amount of pitch alteration;

a step of reading out said music composition data including the notes, the chord names and the key signature;

a step of designating an amount of transposition in terms of the number of semitones;

a step of shifting said chord roots by shifting the names of the respective basic notes by said amount of transposition and obtaining transposed chord roots each of which is expressed by a shifted basic note plus said alteration amount;

a first chord root determining step, operative in the case where said alteration amount is not zero and said shifted basic note becomes a note expressed by a natural note plus an accidental sign and falling on an accidental note, of converting the expression of said shifted basic note to an expression of a natural note which is adjacent to said shifted basic note in the direction of alteration by said accidental sign and adjusting said alteration amount by the amount and in the reverse direction of the conversion of said shifted basic note, thereby obtaining a transposed chord name;

a second chord root determining step, operative in the case where said alteration amount is not zero and said shifted basic note becomes a note expressed by a natural note plus an accidental sign and falling on a natural note, of converting the expression of said shifted basic note to an expression of said natural note on which said shifted basic note falls and adjusting said alteration amount by the amount and in the reverse direction of the conversion of said shifted basic note, thereby obtaining a transposed chord name;

a third chord root determining step, operative in the case where said alteration amount is zero, of determining the expression of said shifted basic note in view of the tonality after the transposition, thereby obtaining a transposed chord name; and a step of rewriting chord names contained in said stored music composition data according to said transposed chord name obtained by said first, second or third chord root determining step.

12. A method for exhibiting a musical score based on musical composition data, said method comprising:

a step of providing music composition data representing a length of music containing a progression of notes;

a step of displaying a music score based on said music composition data;

a step of determining an optimum tonality by examining said music composition data to find, with respect to each of plural tonalities, how many notes as represented by said music composition data are contained in said each tonality to determine an optimum tonality based on said examining; and a step of controlling said display device to display said music score according to said optimum tonality.

13. A method for determining musical notational symbols based on musical composition data, said method comprising:

a step of reading out, from a storing device, music composition data representing a length of music containing a progression of notes together with a key signature and a major/minor designation;

a step of determining what accidental signs to be affixed to which of said notes according to the note name, the key signature and the major/minor designation; and a step affixing each of said determined accidental signs to the note to which said each determined accidental sign is to be affixed.

14. A machine readable medium for use in a musical notational symbol determining apparatus comprising a computer, said medium containing program instructions executable by said computer for executing:

a process of reading out, from a storing device, music composition data representing a length of music containing a progression of notes;

a process of counting the number of notes which are intrinsic to each of a predetermined plurality of tonalities among the notes contained in a selected span of said length of music;

a first selecting process of selecting a single optimum tonality or plural tonality candidates based on the counted number of intrinsic notes with respect to each tonality according to a first selection rule;

a process of extracting notes to be subjected to judgment from among a top sub-span of said selected span;

a process of examining whether there is a single tonality whose tonic chord includes all of said extracted subject notes among said plural tonality candidates;

a second selecting process of selecting, if and only if there is such a single tonality, said single tonality to be an optimum tonality;

a third selecting process of selecting a tonality having a least number of accidental signs among said plural tonality candidates to be an optimum tonality; and a process of determining a key signature for said optimum tonality selected by any one of said first, second and third selecting processes.

15. A machine readable medium for use in a musical notational symbol determining apparatus comprising a computer, said medium containing program instructions executable by said computer for executing:

a process of reading out, from a storing device, music composition data representing a length of music containing a progression of notes, together with chord names and a tonality expressed with enharmonic discrimination, each of said chord names being identified by a chord root and a chord type, said chord root being expressed by a name of a basic note plus an amount of pitch alteration;

a process of reading out said music composition data including the notes, the chord names and the key signature;

a process of designating an amount of transposition in terms of the number of semitones;

a process of shifting said chord roots by shifting the names of the respective basic notes by said amount of transposition and obtaining transposed chord roots each of which is expressed by a shifted basic note plus said alteration amount;

a first chord root determining process, operative in the case where said alteration amount is not zero and said shifted basic note becomes a note expressed by a natural note plus an accidental sign and falling on an accidental note, of converting the expression of said shifted basic note to an expression of a natural note which is adjacent to said shifted basic note in the direction of alteration by said accidental sign and adjusting said alteration amount by the amount and in the reverse direction of the conversion of said shifted basic note, thereby obtaining a transposed chord name;

a second chord root determining process, operative in the case where said alteration amount is not zero and said shifted basic note becomes a note expressed by a natural note plus an accidental sign and falling on a natural note, of converting the expression of said shifted basic note to an expression of said natural note on which said shifted basic note falls and adjusting said alteration amount by the amount and in the reverse direction of the conversion of said shifted basic note, thereby obtaining a transposed chord name;

a third chord root determining process, operative in the case where said alteration amount is zero, of determining the expression of said shifted basic note in view of the tonality after the transposition, thereby obtaining a transposed chord name; and a process of rewriting chord names contained in said stored music composition data according to said transposed chord name obtained by said first, second or third chord root determining process.

16. A machine readable medium for use in a musical score exhibiting apparatus comprising a computer, said medium containing program instructions executable by said computer for executing:
- a process of providing music composition data representing a length of music containing a progression of notes;
- a process of displaying a music score based on said music composition data;
- a process of determining an optimum tonality by examining said music composition data to find, with respect to each of plural tonalities, how many notes as represented by said music composition data are contained in said each tonality to determine an optimum tonality based on said examining; and
- a process of controlling said display device to display said music score according to said optimum tonality.

17. A machine readable medium for use in a musical notational symbol determining apparatus comprising a computer, said medium containing program instructions executable by said computer for executing:
- a process of reading out, from a storing device, music composition data representing a length of music containing a progression of notes together with a key signature and a major/minor designation;
- a process of determining what accidental signs to be affixed to which of said notes according to the note name, the key signature and the major/minor designation; and
- a process affixing each of said determined accidental signs to the note to which said each determined accidental sign is to be affixed.

* * * * *